United States Patent
Ng et al.

(10) Patent No.: US 12,202,518 B2
(45) Date of Patent: Jan. 21, 2025

(54) SAFETY DECOMPOSITION ARCHITECTURE FOR AUTONOMOUS MACHINE APPLICATIONS

(71) Applicant: NVIDIA Corporation, Santa Clara, CA (US)

(72) Inventors: Julia Ng, San Jose, CA (US); Sachin Pullaikudi Veedu, Santa Clara, CA (US); David Nister, Bellevue, WA (US); Hanne Buur, Boulder, CO (US); Hans Jonas Nilsson, Los Gatos, CA (US); Hon Leung Lee, Bellevue, WA (US); Yunfei Shi, Santa Clara, CA (US); Charles Jerome Vorbach, Jr., Bronxville, NY (US)

(73) Assignee: NVIDIA Corporation, Santa Clara, CA (US)

( * ) Notice: Subject to any disclaimer, the term of this patent is extended or adjusted under 35 U.S.C. 154(b) by 340 days.

(21) Appl. No.: 17/497,685

(22) Filed: Oct. 8, 2021

(65) Prior Publication Data

US 2022/0135075 A1 May 5, 2022

Related U.S. Application Data

(60) Provisional application No. 63/108,439, filed on Nov. 2, 2020.

(51) Int. Cl.
*B60W 60/00* (2020.01)
*B60W 30/095* (2012.01)
*G06F 9/50* (2006.01)

(52) U.S. Cl.
CPC ...... *B60W 60/0015* (2020.02); *B60W 30/095* (2013.01); *B60W 60/0011* (2020.02); *G06F 9/505* (2013.01); *B60W 2420/403* (2013.01)

(58) Field of Classification Search
CPC ......... B60W 60/0015; B60W 60/0011; B60W 30/095
See application file for complete search history.

(56) References Cited

U.S. PATENT DOCUMENTS 7,409,295 B2   8/2008 Paradie
8,204,642 B2   6/2012 Tanaka et al.
(Continued)

FOREIGN PATENT DOCUMENTS

DE        102013213169 A1 *  1/2015  ........ B60W 30/0956
DE    10 2015 221 920 A1     5/2017
(Continued)

OTHER PUBLICATIONS

Bülent Sari, Fail-operational Safety Architecture for ADAS/AD Systems and a Model-driven Approach for Dependent Failure Analysis, Feb. 5, 2020, Springer Nature (Year: 2020).*
(Continued)

*Primary Examiner* — Hussein Elchanti
*Assistant Examiner* — Oliver Tan
(74) *Attorney, Agent, or Firm* — Taylor English Duma L.L.P.

(57) ABSTRACT

In various examples, a safety decomposition architecture for autonomous machine applications is presented that uses two or more individual safety assessments to satisfy a higher safety integrity level (e.g., ASIL D). For example, a behavior planner may be used as a primary planning component, and a collision avoidance feature may be used as a diverse safety monitoring component—such that both may redundantly and independently prevent violation of safety goals. In addition, robustness of the system may be improved as single point and systematic failures may be avoided due to the requirement that two independent failures—e.g., of the behavior planner component and the collision avoidance (Continued)

component—occur simultaneously to cause a violation of the safety goals.

20 Claims, 13 Drawing Sheets

(56) References Cited

U.S. PATENT DOCUMENTS

| | | | |
|---|---|---|---|
| 9,063,546 B2 * | 6/2015 | Hauler | G05D 1/0268 |
| 9,701,307 B1 | 7/2017 | Newman et al. | |
| 10,007,269 B1 | 6/2018 | Gray | |
| 10,133,274 B2 | 11/2018 | Shashua et al. | |
| 10,134,278 B1 | 11/2018 | Konrardy et al. | |
| 10,289,469 B2 | 5/2019 | Fortino et al. | |
| 10,359,772 B2 * | 7/2019 | Poledna | G05B 19/042 |
| 10,372,136 B2 | 8/2019 | Yang et al. | |
| 10,489,972 B2 | 11/2019 | Atsmon | |
| 10,535,269 B2 * | 1/2020 | Um | B60W 30/0953 |
| 10,625,748 B1 | 4/2020 | Dong et al. | |
| 10,635,110 B2 | 4/2020 | Shashua et al. | |
| 10,730,517 B2 | 8/2020 | Park et al. | |
| 10,885,698 B2 | 1/2021 | Muthler et al. | |
| 10,942,030 B2 | 3/2021 | Haque et al. | |
| 11,079,764 B2 * | 8/2021 | Nister | G05D 1/0231 |
| 2009/0125177 A1 | 5/2009 | Tanaka et al. | |
| 2016/0321074 A1 | 11/2016 | Hung et al. | |
| 2017/0010108 A1 | 1/2017 | Shashua | |
| 2017/0090478 A1 | 3/2017 | Blayvas et al. | |
| 2017/0259801 A1 | 9/2017 | Abou-Nasr et al. | |
| 2017/0364083 A1 | 12/2017 | Yang et al. | |
| 2018/0121273 A1 | 5/2018 | Fortino et al. | |
| 2018/0253103 A1 | 9/2018 | Winkler et al. | |
| 2019/0016285 A1 | 1/2019 | Freienstein et al. | |
| 2019/0071101 A1 | 3/2019 | Emura et al. | |
| 2019/0212749 A1 | 7/2019 | Chen et al. | |
| 2019/0243371 A1 * | 8/2019 | Nister | G06N 3/08 |
| 2019/0250622 A1 | 8/2019 | Nister et al. | |
| 2019/0258251 A1 | 8/2019 | Ditty et al. | |
| 2021/0001881 A1 * | 1/2021 | Poledna | B60W 60/0013 |
| 2021/0046923 A1 * | 2/2021 | Olson | G05D 1/0214 |
| 2022/0048535 A1 * | 2/2022 | Niendorf | G01C 21/3461 |

FOREIGN PATENT DOCUMENTS

| | | |
|---|---|---|
| DE | 10 2015 226 762 A1 | 6/2017 |
| DE | 102019214931 A1 * | 4/2021 |
| KR | 102441062 B1 * | 10/2017 |
| WO | 2018/002910 A1 | 1/2018 |

OTHER PUBLICATIONS

Rami Debouk et al., ASIL Decomposition: The Good, the Bad, and the Ugly, Apr. 8, 2013, SAE International ISSN: 0148-7191, e-ISSN: 2688-3627 (Year: 2013).*

DE102019214931A1 espacenet Machine translation, with paragraph numbers.*

A Generic Method for Bottom-Up ASIL Decomposition, Frigerio et al., Springer, Sep. 2018 (Year: 2018).*

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

ISO 21448, "Road Vehicles—Safety of The Intended Functionality", International Organization for Standardization (ISO), Retrieved from Internet URL: https://de.wikipedia.org/wiki/ISO/PAS_21448, accessed on May 27, 2022, 3 Pages.

ISO 26262, "Hazard analysis and risk assessment (HARA)", Retrieved from Internet URL: https://github.com/userqin/ISO26262/blob/master/hazard-analysis-and-risk-assessment-hara.md, accessed on Jun. 6, 2022, pp. 5.

International Search Report and Written Opinion mailed Apr. 10, 2019 in International Patent Application No. PCT/US2019/016418, 9 pages.

International Search Report and Written Opinion mailed Oct. 17, 2019 in International Patent Application No. PCT/US2019/012535, 20 pages.

International Preliminary Report on Patentabilty International Patent Application No. PCT/US2019/012535 mailed Jul. 16, 2020, 16 pages.

International Preliminary Report on Patentability received for PCT Application No. PCT/US2019/016418, mailed on Aug. 13, 2020, 8 pages.

International Preliminary Report on Patentability received for PCT Application No. PCT/US2019/024400, mailed on Oct. 8, 2020, 10 pages.

U.S. Appl. No. 62/978,309, "Behavior Planning Architecture for Autonomous Machines", of David Nister et al., filed on Feb. 19, 2020.

"Taxonomy and Definitions for Terms Related to Driving Automation Systems for On-Road Motor Vehicles", Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", Society of Automotive Engineers (SAE), Standard No. J3016-201806, pp. 1-35 (Jun. 15, 2018).

"Systems and Methods for Safe and Reliable Autonomous Vehicles" U.S. Appl. No. 62/584,549, filed Nov. 10, 2017.

"System and Method for Controlling Autonomous Vehicles" U.S. Appl. No. 62/614,466, filed Jan. 7, 2018.

"System and Method For Safe Operation of Autonomous Vehicles," U.S. Appl. No. 62/625,351, filed Feb. 2, 2018.

"Safety Procedures in Autonomous Vehicles," U.S. Appl. No. 62/768,064, filed Nov. 11, 2018.

"Safety Procedures in Autonomous Vehicles," U.S. Appl. No. 62/760,916, filed Nov. 13, 2018.

Bojarski, M., et al., "End to End Learning for Self-Driving Cars", Retrieved from Internet URL :https://nvidia.com/contenl/tegra/automotive/images/2016/solutions/pdf/end-to-end-dl-using-px.pdf, accessed on Mar. 18, 2019, pp. 9 (Apr. 25, 2016).

Jayaraman, A., et al., "Creating 3D Virtual Driving Environments for Simulation-Aided Development of Autonomous Driving and Active Safety", SAE Technical Paper 2017-01-0107, pp. 3 (Mar. 28, 2017) (See English Abstract).

Nister, D., et al., "An Introduction to the Safety Force Field", NVIDIA, Retrieved from Internet URL : https://www.nvidia.com/content/dam/en-zz/Solutions/self-driving-cars/safety-force-field/an-introduction-to-the-safety-force-field-v2.pdf, accessed on Jan. 8, 2020, pp. 27 (Mar. 2019).

Ching Y. Hung et al. "Programmable Vision Accelerator", U.S. Appl. No. 62/156,167, filed May 1, 2015.

Mohammed Abdulla Yousuf et al. "Methodology of Using a Single Controller (ECU) For a Fault-Tolerant/Fail-Operational Self-Driving System", U.S. Appl. No. 62/524,283, filed Jun. 23, 2017.

* cited by examiner

SAFETY DECOMPOSITION ARCHITECTURE FOR AUTONOMOUS MACHINE APPLICATIONS

CROSS-REFERENCE TO RELATED APPLICATIONS

This application claims the benefit of U.S. Provisional Application No. 63/108,439, filed on Nov. 2, 2020, which is hereby incorporated by reference in its entirety.

This application is related to U.S. Pat. No. 11,079,764, granted on Aug. 3, 2021, and U.S. Non-Provisional application Ser. No. 16/877,127, filed on May 18, 2020, each of which is hereby incorporated by reference in its entirety.

BACKGROUND

Automated driving systems (ADSs) may include various features that perform dynamic driving tasks (DDTs) on a sustained basis—e.g., at society of automotive engineers (SAE) automation level 3-5. For example, crash avoidance capability is an inherent component of the ADS functionality, as a human driver is not required to take over the DDT. As such, hazardous events and the associated risks at the vehicle level for incorrect operation of ADS are identified using an ISO 262626:2018 (and/or 2011) hazard analysis and risk assessment (HARA) method. The resulting safety goals of ADS may be categorized as: (1) avoiding collision with obstacles (e.g., vulnerable road users (VRUs), vehicles, physical obstacles, etc.); (2) honoring rules of the road (e.g., traffic lights, traffic signs, crosswalks, etc.); and (3) avoiding active roadway departure (e.g., avoiding entering oncoming traffic, departing a road boundary, etc.). Due to the high risk when in violation of these safety goals, HARA analysis requires a highest level of safety—e.g., automotive safety integrity level (ASIL) D. As such, in order to ensure that the safety goals are not violated, the ADS hardware and software components that affect the safety goals must also inherit ASIL D integrity.

However, designing a behavior planning system that performs a safety evaluation in compliance with ASIL D is a challenging task, as a system compliant with ASIL D must not include a single point of failure. As such, conventional systems may employ system level redundancy to remove the ability for a single point of failure. In behavior planning architectures, though, one or more inputs or outputs may not have ASIL level of ASIL D, thus making them non-compliant for satisfying various safety goals. As a result, conventional systems may be incapable of satisfying ASIL D requirements, or may require two or more individual rule-based approaches that are each compliant with ASIL D, which may be computationally expensive and may lead to increased latency in the system.

SUMMARY

Embodiments of the present disclosure relate to a safety decomposition architecture for autonomous machine applications. Systems and methods are disclosed that use safety decomposition—e.g., two or more individual safety assessments of a lower safety integrity level (e.g., ASIL B(D))—within a behavior or motion planning system of an autonomous or semi-autonomous machine to satisfy a higher safety integrity level (e.g., ASIL D). For example, due to one or more of the inputs or outputs of the behavior planner falling under ASIL D, safety decomposition may be used to reach ASIL D compliance.

In contrast to conventional systems, such as those described above, asymmetric redundancy may be used for an ADS planning component in which diverse ADS planner concepts may be implemented that independently and redundantly prevent violation of the safety goals (described above). In embodiments, a behavior planner may be used as a primary ADS planning component, and a collision avoidance feature may be used as a diverse safety monitoring component—such that both may redundantly and independently prevent any violation of safety goals. To accomplish this, the ASIL D requirement for the ADS planner may be achieved by employing an ASIL decomposition scheme as ASIL B(D) for the behavior planning component and ASIL B(D) for the collision avoidance component. This lowered ASIL requirement for each individual component still satisfies the redundancy requirements of ASIL D while improving flexibility of the design due to less stringent safety requirements—e.g., from ISO 26262. In addition, robustness of the system may be improved as single point and systematic failures may be avoided due to the requirement that two independent failures—e.g., of the behavior planner component and the collision avoidance component—occur simultaneously to cause a violation of the safety goals.

In embodiments, a safety procedure trajectory corresponding to a safety procedure of an ego-machine may be generated and evaluated using two or more processing pipelines—e.g., the behavior planner pipeline and the collision avoidance pipeline. The behavior planner pipeline may score one or more generated trajectories based on one or more criteria—such as safety, comfort, etc.—using the safety procedure trajectory and the collision avoidance pipeline may determine whether the generated trajectories (or at least an initial portion of the generated trajectories) are at least as safe as the safety procedure trajectory (e.g., do not result in a collision). The determinations from each of the two or more pipelines may then be fed to a trajectory selector that may select a trajectory that is the safest, above a safety threshold, and/or the like, and the selected trajectory—which may include the safety procedure trajectory, in embodiments—may be used by one or more control components of an ego-machine to control the ego-machine according to the selected trajectory. As a result, two or more separate safety evaluation pipelines that may only satisfy a lower safety integrity level (e.g., ASIL B(D)) may be used to satisfy a higher safety integrity level (e.g., ASIL D).

To account for the rules of the road—one of the safety goals outlined above—artificial obstacles may be generated and included in the evaluation of the safety of any given trajectory. For example, where a light is red, an artificial boundary may be generated at the entrance to the intersection such that a collision avoidance component may identify the artificial boundary, and determine that any trajectory through the intersection would intersect the boundary, and thus is unsafe. In this way, without requiring extensive rules for each intersection, the artificial boundaries may be evaluated similarly to a real detected object or boundary in the environment—thereby reducing compute and latency.

BRIEF DESCRIPTION OF THE DRAWINGS

The present systems and methods for a safety decomposition architecture for autonomous machine applications are described in detail below with reference to the attached drawing figures, wherein.

DETAILED DESCRIPTION

Figure 1:
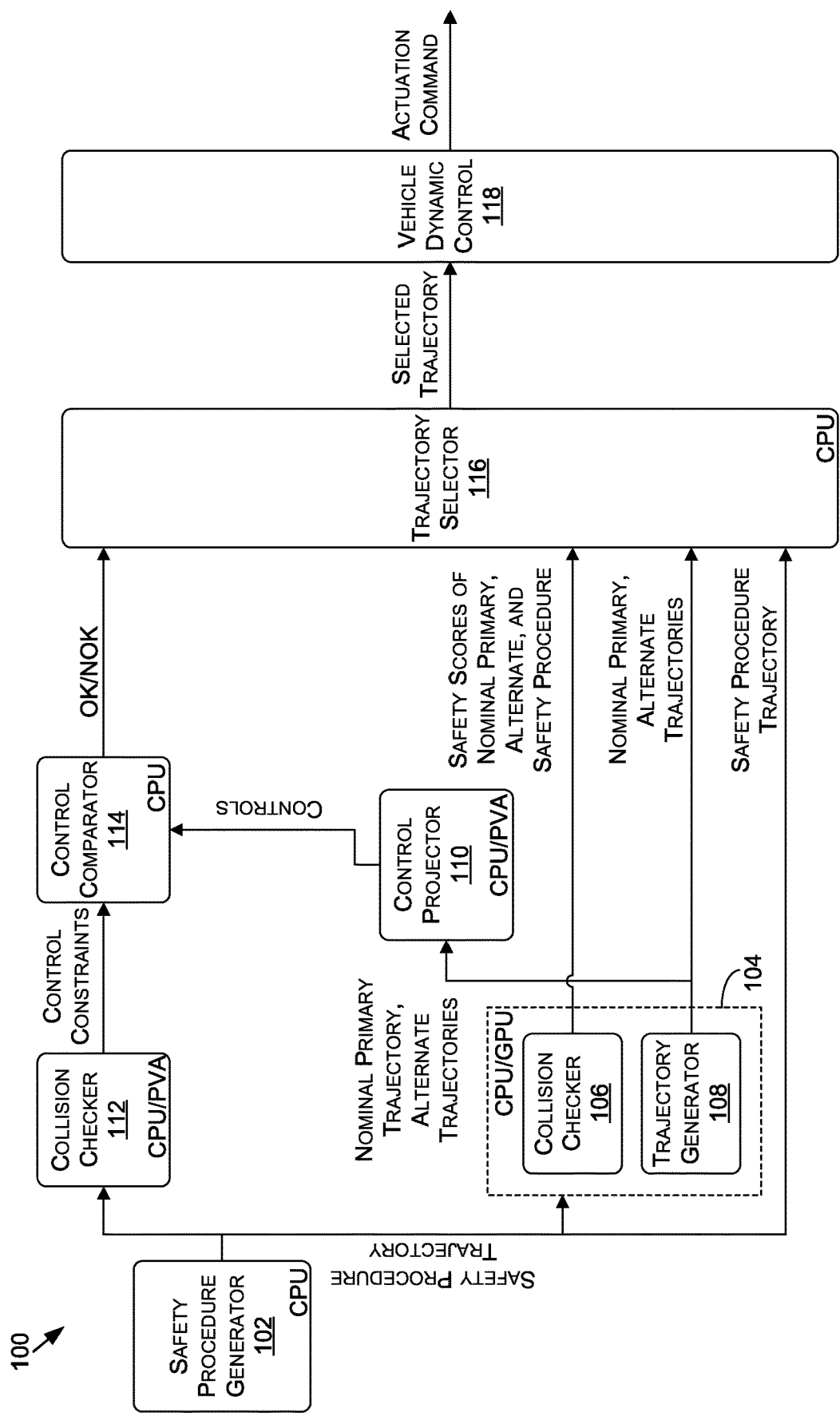
FIG. 1 is an example data flow diagram for a process of selecting a trajectory using safety decomposition, in accordance with some embodiments of the present disclosure.

Systems and methods are disclosed related to a safety decomposition architecture for autonomous machine applications. Although the present disclosure may be described with respect to an example autonomous vehicle 800 (alternatively referred to herein as "vehicle 800," "ego-vehicle 800," or "ego-machine 800," an example of which is described with respect to FIGS. 8A-8D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to safety decomposition or safety evaluation of one or more trajectories of an autonomous or semi-autonomous machine, this is not intended to be limiting, and the systems and methods described herein may be used in augmented reality, virtual reality, mixed reality, robotics, security and surveillance, autonomous or semi-autonomous machine applications, and/or any other technology spaces where safety evaluations of machine trajectories may be used.

At the application level, an automated driving system (ADS) may include any number of functional components—such as a component for environmental understanding, a component for planning and control, and a vehicle platform component. The environmental understanding component (or world model management component) may include functionality to understand the surroundings of an ego-machine, the planning and control component may use the view of the world from the environmental understanding component to decide appropriate safety actions of the ADS to complete a task or mission, and the vehicle platform component may execute these commands or actions. Each functional component may require development, verification, and validation with stringent automotive safety integrity level (ASIL) D compliance—which requires significant development effort and cost. To account for this, the system and methods of the present disclosure include an ASIL D compliant planning and control component of an ADS that significantly reduces the development, verification, and validation effort while at the same time providing an improved flexibility and robustness in design.

With respect to safety decomposition, in safety engineering, there are generally reasonably rich rules to combine components developed at different safety integrity levels into a single component with a higher integrity level. For example, an ASIL B component may be combined or its output fused with another ASIL B component or another ASIL B component's output to achieve ASIL D (e.g., ASIL D=ASIL B(D)+ASIL B(D)). This process of combining two independent components together may be referred to as ASIL decomposition. In examples where two or more components work together to achieve a higher ASIL, there must be supporting analysis and evidence that they are sufficiently free from common cause failures that would lead to a coupled failure.

In addition to or alternatively from safety integrity levels, certain safety standards may include accuracy requirements for intended functions or safety goals of the machine. For example, in ISO 21448, accuracy or performance requirements may be included in the criteria for satisfying safety standards. In some examples, where the safety integrity level is high, the performance or accuracy requirement may also be high. For example, an ASIL D requirement may also include an accuracy requirement that there is allowed only one failure in 10^8 hours of usage. As an example, a first component having a first accuracy or performance level (e.g., failure every 10^4 hours) may be combined or its output fused with another component or another component's output having a second accuracy or performance level (e.g., failure of 10^4 hours) such that the two outputs when used together, may have a failure of 10^8 hours. In this way, a higher safety integrity level may be achieved without requiring that each contributing process or component satisfy the same higher safety integrity level.

With reference to FIG. 1, FIG. 1 is an example safety decomposition process 100 for a safety decomposition system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

The process 100 may include generating and/or receiving sensor data from one or more sensors of an ego-machine 800. The sensor data may be used by the ego-machine 800, and within the process 100, to determine one or more trajectories for the ego-machine through an environment. The sensor data may include, without limitation, sensor data from any of the sensors of the ego-machine 800 (and/or other vehicles or objects, such as robotic devices, VR systems, AR systems, etc., in some examples). For example, and with reference to FIGS. 8A-8C, the sensor data may include the data generated by, without limitation, global navigation satellite systems (GNSS) sensor(s) 858 (e.g., Global Positioning System sensor(s), differential GPS (DGPS), etc.), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the ego-machine 800 and/or distance traveled), and/or other sensor types.

In some examples, the sensor data may include the sensor data generated by one or more forward-facing sensors, side-view sensors, and/or rear-view sensors. This sensor data may be useful for identifying, detecting, classifying, and/or tracking movement of objects around the ego-machine 800 within the environment. In embodiments, any number of sensors may be used to incorporate multiple fields of view (e.g., the fields of view of the long-range cameras 898, the forward-facing stereo camera 868, and/or the forward facing wide-view camera 870 of FIG. 8B) and/or sensory fields (e.g., of a LIDAR sensor 864, a RADAR sensor 860, etc.).

The sensor data may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data may be used within the process 100 without any pre-processing (e.g., in a raw or captured format), while in other examples, the sensor data may undergo pre-processing (e.g., noise balancing, demosaicing, scaling, cropping, augmentation, white balancing, tone curve adjustment, etc., such as using a sensor data pre-processor (not shown)). As used herein, the sensor data may reference unprocessed sensor data, pre-processed sensor data, or a combination thereof.

The sensor data may be used, at least in part, by a safety procedure generator 102 to generate a safety procedure trajectory that may be used by a collision checker 112, a collision checker 106, and/or a trajectory selector 116 to determine a selected trajectory. The safety procedure generator 102 may analyze the sensor data to determine a safety procedure—e.g., come to a complete stop, align with road and come to a complete stop, steer to shoulder or side of road and come to a complete stop, etc.—or the ego-machine 800. Once the safety procedure is determined, the safety procedure trajectory may be generated according to the safety procedure. For example, where a safety procedure is to come to a complete stop, the safety procedure trajectory may include a path through the environment from a current location of the ego-machine 800 to a location where the ego-machine 800 will come to a complete stop.

In embodiments, to generate a projected safety procedure trajectory the ego-machine 800, approaches described in U.S. Pat. No. 11,079,764, granted on Aug. 3, 2021, and U.S. Non-Provisional application Ser. No. 16/877,127, filed on May 18, 2020, may be applied or implemented. For example, a state determiner may determine a state of the actors (e.g., the ego-machine 800 and other objects, static or dynamic) in the environment. The state of each actor may generally include a location, a speed, a direction (e.g., direction of travel), a velocity, an acceleration(s) (e.g., scalar, rotational, etc.), a pose (e.g., orientation) and/or other information about the state of the actors. The state may encode or represent the position of the actor in two-dimensional space (e.g., (x, y) coordinates), a unit direction of the actor, and/or a magnitude of velocity of the actor at a point in time. In some examples, the state may encode or represent additional or alternative information, such as rotational velocity (e.g., yaw) and/or magnitude of acceleration in any direction. For example, a state, $x_A$, for each actor, may be parameterized as an m-dimensional state vector, represented as follows, in equation (1):

$$x_A(t) \in \mathbb{R}^m \tag{1}$$

As an example, such as where the state, $x_A$, is a five-dimensional vector (e.g., m=5), the state vector may be represented as follows, in equation (2):

$$x_A = [y^T d^T v]^T \tag{2}$$

where y is the position of the actor in two-dimensional space, d is a unit direction vector, and v is a magnitude of velocity.

For each actor, when the state of the actor is viewed as a function of time, a vector may represent a state trajectory, $X_A$, of the actor (e.g., the state trajectory, $X_A$, may represent or encode each state, $x_A$, of the actor at each time within a period of time). The state trajectories may be determined for each of the actors by the state determiner, and the collection of the states (e.g., at any one time) and/or the collection of the state trajectories (e.g., as a function of time) may include a set of state spaces or state trajectories for all actors in the environment.

The state determiner may determine the state of the ego-machine 800 using any combination of sensors, such as the GNSS sensors 858, the IMU sensor(s) 866, the speed sensor(s) 844, the steering sensor(s) 840, etc. The state determiner may determine and/or infer the state of the objects in the environment—e.g., other than the ego-machine 800—using any combination of the stereo camera(s) 868, the wide-view camera(s) 870, the infrared camera(s) 872, the surround camera(s) 874, the long range and/or mid-range camera(s) 898, the LIDAR sensor(s) 864, the RADAR sensor(s) 860, the microphone(s) 896, the ultrasonic sensor(s) 862, and/or other sensors of the ego-machine 800. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In some examples, machine learning models, such as neural networks (e.g., convolutional neural networks), may be used to determine the states of the actors. For example, sensor data from the sensors of the ego-machine 800 may be applied to one or more machine learning models in order to aid the ego-machine 800 in determining the state of the objects in the environment. For example, the ego-machine 800 may be configured to quickly and efficiently execute neural networks, on processed and/or unprocessed data for a variety of functions. For example, and without limitation, a convolutional neural network may be used for object detection and identification (e.g., using sensor data from camera(s) of the ego-machine 800), a convolutional neural network may be used for distance estimation (e.g., using the sensor data from the camera(s) of the ego-machine 800), a convolutional neural network may be used for emergency vehicle detection and identification (e.g., using sensor data from the microphone(s) of the ego-machine 800), a convolutional neural network may be used for facial recognition and vehicle owner identification (e.g., using the sensor data from the camera(s) of the ego-machine 800), a convolutional neural network may be used for identifying and processing security and/or safety related events, and/or other machine learning models may be used. In examples using convolutional neural networks, any type of convolutional neural networks may be used, including region-based convolutional neural networks (R-CNNs), Fast R-CNNs, and/or other types. In addition to or alternatively from CNNs, any type of machine learning model may be implemented, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Once the state of the actors is determined, a control model may be determined for the actors (e.g., by the safety procedure generator 102, the collision checker 112, and/or the collision checker 106). For example, a control model may be represented as follows, in equation (3):

$$\frac{dx_A}{dt} = f(x_A, t, c) \tag{3}$$

As such, the control model for an actor may represent a derivative of the state of the actor, $x_A$, with respect to time, t, and control parameter(s), c. The control model may be formulated locally as an explicit differential equation with control parameter(s), c, that may model user input, such as steering, braking, and acceleration. For example, in some examples, the control model for an actor may be expressed according to equation (4), below:

$$\frac{dx_A}{dt} = [vd^T \, vbd_\perp^T a]^T \tag{4}$$

where v is a magnitude of velocity, d is unit direction vector, a is a magnitude of acceleration amount, b is a scalar steering parameter, and $d_\perp$ is the perpendicular to d, generated by flipping the coordinates of d and negating the first coordinate. In the example of equation (4), the control parameters may be a, the magnitude of acceleration amount, and b, the scalar steering parameter.

Once the control model is determined, a control policy may be determined (e.g., by the safety procedure generator 102, the collision checker 112, and/or the collision checker 106). For example, the control parameters may be a function of the world state, $x_w$ (or a perception of the world state based on the sensor data generated by the sensors of the ego-machine 800), and time, t. As such, a control policy may be a function of the joint state space of the world and time into $\mathbb{R}^m$ (where m is the dimension of the state space of the actor) that is smooth and bounded. For example, a control policy may be represented as follows, in equation (5):

$$\frac{dx_A}{dt} = f(x_A, t, c(x_w, t)) \tag{5}$$

Once the control policy is determined, a safety procedure may be determined for each actor (e.g., by the safety procedure generator 102, the collision checker 112, and/or the collision checker 106). For example, as described herein, each actor may be assumed to have a safety procedure, SA. The safety procedure may have an associated trajectory(ies) derived from any starting state, $x_A$, of the actor. The safety procedure may represent the trajectory(ies) of the actor as the actor transitions form the state, $x_A$, to an actor state objective (e.g., a final location, where the actor may come to a stop). The actor state objective may be determined, in some examples, by analyzing sensor data received from one or more sensors (e.g., of the ego-machine 800) to determine locations, orientations, and velocities of objects (or other actors) in the environment. Control parameters (e.g., for steering, braking, accelerating, etc.), as described herein, may then be determined for the actors (e.g., the ego-machine 800 and/or the objects), and a set of functions to guide the actor to the actor state objective may be determined.

The safety procedure may result in a trajectory(ies) that changes smoothly with its starting state (e.g., because the safety procedure may be a continuous deceleration to a stop). In some examples, a safety procedure, SA, may be represented as follows, in equation (6):

$$S_A = \left\{ \frac{dx_A}{dt} = f(W, t) \right\} \tag{6}$$

where W represents properties of the world (or environment). The safety procedure for an actor may or may not depend on fixed properties of the world, depending on the embodiment. For example, the safety procedure may not depend on the fixed properties of the world, such as road shape or a map. In such an example, the safety procedure may include freezing a direction vector (e.g., by setting a scalar steering parameter, b, to zero), and coming to a complete stop by slowing down by a range of acceleration values $[a_{min}, a']$ (where $a_{min}$ is minimum acceleration amount or the negative of a maximum braking amount, and a' is a negative value larger than $a_{min}$), to a complete stop. This type of safety procedure, SA, may be represented by equation (7), below:

$$S_A = \left\{ \frac{dx_A}{dt} = [vd^\top\ 0\ a]^\top : a_{min} \le a \le a' \right\} \tag{7}$$

In any example, the safety procedure may include braking until reaching a complete stop. At high speeds, without limitation, the safety procedure may include lining up with a current lane (or with the direction of the road, such as when the ego-machine 800 is in the middle of a lane change), and then coming to a complete stop (and thus may depend on fixed properties of the world, such as lane markings). For example and without limitation, at low speeds, the safety procedure may include the ego-machine 800 steering itself to a side of the road as it decelerates to a stop (and thus may depend on the fixed properties of the world). For example, one or more neural networks (e.g., convolutional neural networks) may be used to identify the side of the road and/or to aid in maneuvering the ego-machine 800 to the side of the road. As another example, an HD map 822 and/or another map type may be used. In such an example, the HD map 822 may be received over a network(s) 890 and/or may be embedded in the ego-machine 800.

In yet another example, the safety procedure may be modified to provide for a certain level of comfort (e.g., maximum comfort) for the passengers of the vehicle (e.g., minimum deceleration or directional change) while still guaranteeing avoidance of a collision. In such an example, a course, trajectory, and/or control sequence may be determined for the ego-machine 800, as the safety procedure, that maximizes comfort and/or minimizes force exerted on passengers while still ensuring that a collision with other objects (e.g., vehicles, entities, structures, etc.) is avoided. In some examples, such as where a collision is unavoidable or a likelihood of collision is above a threshold risk level, the safety procedure may be modified to minimize the risk of harm to the passengers in the vehicle and other entities should a collision occur.

In any example, the safety procedures for any actor may include a safety margin (e.g., in addition to, or alternatively from, the safety margin described herein with respect to a size of the actor). For example, as time increases in space-time from the time associated with a current state of the actor, the safety margin for the safety procedure may increase. As a result, the safety margin may increase over space-time to account for this error.

With respect to the ego-machine 800, once the safety procedure trajectory is generated, the safety procedure trajectory may be used by the collision checker 112 in a first processing pipeline, the behavior planner 104 in a second processing pipeline, and the trajectory selector 116. In the first processing pipeline—which may include using one or more central processing units (CPUs) and one or more accelerators (e.g., programmable vision accelerators (PVAs))—the collision checker 112 may use the safety procedure trajectory of the ego-machine 800 in addition to safety procedure trajectories of one or more detected objects (static and/or dynamic) in the environment to determine if and where any overlap between the trajectories would take place. For example, and with respect to FIG. 2, the ego-machine 800, a first object 240A (e.g., a vehicle, in this example), and a second object 240B (e.g., a vehicle, in this example) in an environment 226. In this example, the trajectories may occupy a three-dimensional space (e.g., a volume) in space-time within the environment 226. As such, the trajectories may include a longitudinal distance (e.g., a braking or stopping distance), a lateral change (e.g., a steering change), and/or a vertical space (e.g., from the ground plane to a top of a bounding polygon or other shape representative of the occupied set of the actor) occupied by the actors (e.g., the ego-machine 800, the first object 240A, and the second object 240B) if the actors were to implement their respective safety procedures. As such, the trajectories may be analyzed as solid volumes with lengths that increase with velocity (e.g., the faster the actor is moving, the longer the trajectory(ies) and the corresponding points in space-time included in the occupied sets), and the actors may be characterized as driving around with these volumes attached to them (e.g., protruding from them) while performing collision analysis for the volumes (e.g., the trajectories) instead of performing collision analysis on their actual shape. As a result, by guaranteeing no collision in space-time volumes, a guarantee of no collisions in actual space may be induced. This may provide a benefit because avoiding collisions between actual physical objects in actual space requires foresight since actors have inertia, and once a physical overlap takes place, it may already be too late. However, in space-time, the volumes or trajectories may be thought of as frozen once an intersection, overlap, or near intersection or overlap is determined between the volumes in space-time and, because there are both lateral and longitudinal dimensions, and shared geometry between the ego-machine 800 and the object(s) may not be allowed, the ego-machine 800 may be free from collisions (or at least may not contribute to a likelihood of a collision, because the actions of other actors are outside of the control of the ego-machine 800).

Figure 2:
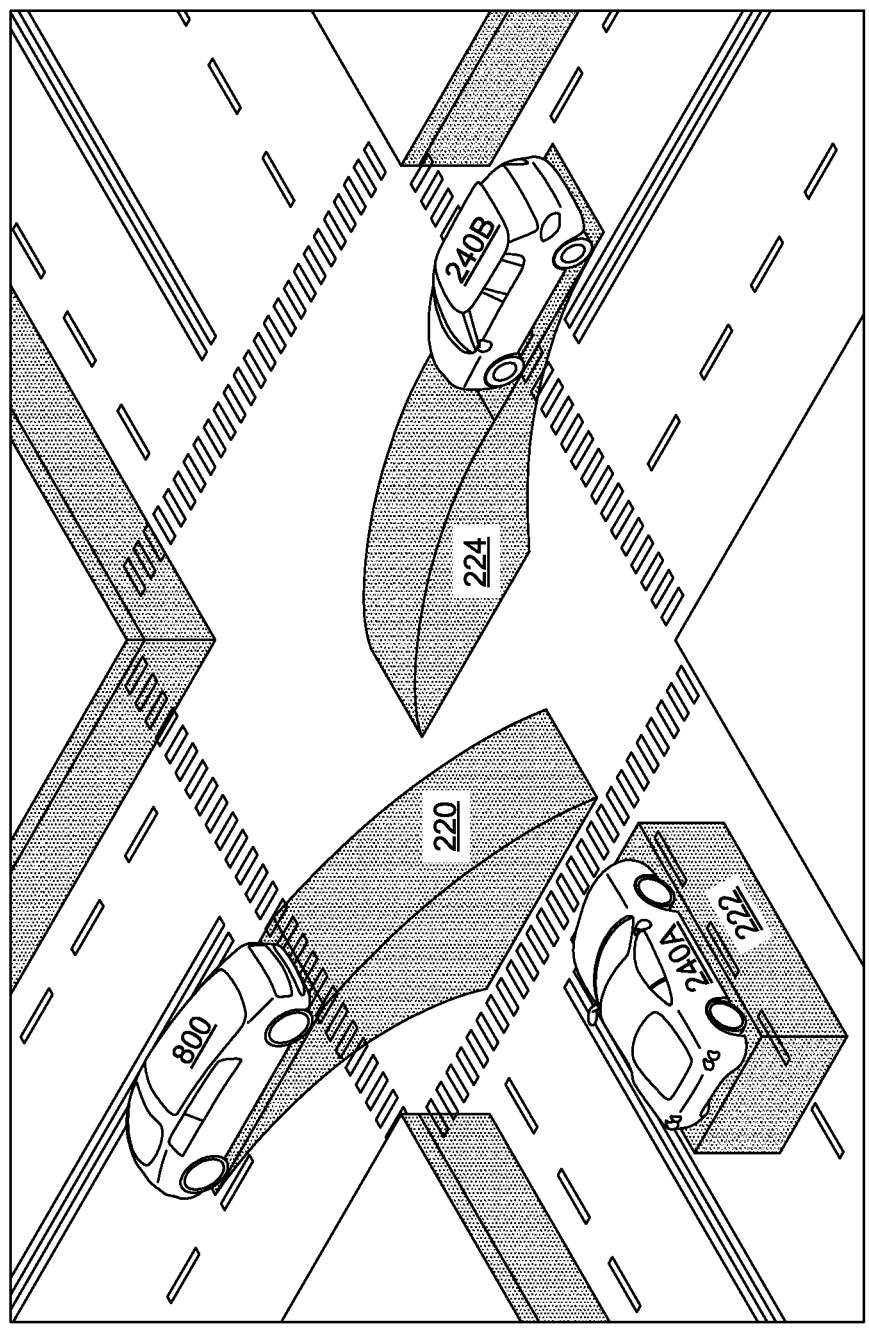
FIG. 2 depicts an example of three-dimensional projections of safety procedures for a plurality of actors in space-time, in accordance with some embodiments of the present disclosure.

In such an example, the ego-machine 800 may generate the vehicle-occupied trajectory(ies) 220 representative of the safety procedure for the ego-machine 800 (applied over a range of profiles, in some examples), the object-occupied trajectory(ies) 222 representative of the safety procedure for the first object 240A, and the object-occupied trajectory(ies) 224 representative of the safety procedure for the second object 240B. In the illustration of FIG. 2, there is no overlap or intersection, or near overlap or intersection, between any of the trajectories 220, 222, and 224. As such, at the point in time illustrated in FIG. 2, neither the ego-machine 800, the first object 240A, nor the second object 240B may implement their safety procedures—e.g., the trajectory selector 116 may not select the safety procedure trajectory as the selected trajectory. However, were one of the trajectories 220, 222, or 224 to overlap or nearly overlap with another of the trajectories 220, 222, or 224, the actors involved in the overlap or near overlap would be expected to implement their safety procedures (e.g., the ego-machine 800 would implement the safety procedure if involved, and would expect the other actor to implement their respective safety procedure, in order to avoid a collision). The points in space-time occupied by the projection of the trajectory(ies) 220 may include the claimed set of the ego-machine 800 when implementing the safety procedure.

In some examples, latency, discretization, and/or reaction time may be at least a few of the practical limitations that may be modeled. For example, the ego-machine 800 may deal with a limitation in perception, or more precisely perception and action, in the sense that when an actor takes action, it is inevitably based on perception that is not completely current (e.g., with a time delay). As a result, when the actor takes action, it may be based on perception of the world at some earlier point in time. For example, an actor (e.g., a human actor, such a manually driven vehicle, or a pedestrian), may have some reaction time (e.g., based on lack of attentiveness due to looking at a phone, or reaching for something, etc.) before noticing that a potential collision may occur. In such an example, the ego-machine 800 may account for this reaction time. In other examples, an actor, such as a vehicle, may include a latency or lag between when a command is received and when the actuation actually occurs. The latency or lag may be known (e.g., after identifying a vehicle type, for example), or may be perceived (e.g., using one or more neural networks). In such examples, the ego-machine 800 may account for this latency or lag. In any example, the shape (e.g., length, width, height, etc.) of the trajectory(ies) of the claimed sets for the actors (e.g., the ego-machine 800 and/or the objects) may be adjusted (e.g., lengthened, widened, etc.) to account for latency, lag, or reaction time.

In some examples, it may be assumed that the amount of latency is $\Delta t$. In order to account for $\Delta t$, in some examples, a form of worst-case forward prediction may be used, such that a forwarded set, $\Phi_A(x_A, \Delta t)$, of actor A by a time interval, $\Delta t$, is the set of all states that actor A could possibly get to at the time interval $\Delta t$ after being in state, $x_A$. The forwarded set of a collection $\Theta$, of actors by a time interval $\Delta t$, may be the union of the forwarded sets of all actors in $\Theta$, as represented by equation (8), below:

$$\Phi(\Theta, \Delta t) = \cup_{A \in \Theta} \Phi_A(x_A, \Delta t) \quad (8)$$

An actor may typically have a better ability to predict its own state than that of other actors. In particular, in the control system of the ego-machine 800, the actual command sequence that was previously sent may be known, providing an ability to predict where the actor itself will be when the actuation command (e.g., delivered to actuation component(s) of the ego-machine 800) that is deliberated now is actually issued. For practical purposes, this may allow the forwarded set to include only one point, effectively resulting in deterministic forwarding, and further resulting in a single actor state. In general, the forwarding mechanism may be non-deterministic forwarding, and may result in a set of states. While in some examples non-deterministic forwarding of the actor itself may be used, and may require that the control policy is safe for all the possible states the actor, in other examples, in order to reduce complexity, deterministic forwarding of the actor itself may be assumed.

A result may be a control policy for the forwarded actor, assuming implicitly that the state parameterization is updated with prediction based on all the actuation commands in the queue up to the actuation command currently deliberated. With these assumptions, the control command may apply to the actor state considered, and the only delay may be the information regarding other actors (e.g., the objects other than the ego-machine 800).

A forwarded control policy may be safe at the current time with respect to wherever the perceived collection of actors moved, despite the latency limitations between perception and action. This again may be a direct consequence of the worst-case assumption and the definition of a safe control policy. Since all constraints (e.g., from wherever in the environment other actors may reach at the time the control of the ego-machine 800 is executed) that may be present are assumed to be present, the ego-machine 800 may thus be obeying all relevant constraints.

In addition, the ego-machine 800 of the present invention may combine latency awareness with visibility awareness, and may use this information to avoid entering unreasonable states. For example, consider the set, $\Phi(V, \Delta t) \cup (\Phi(A, \Delta t) \cap \Psi)$ where V, A, $\Psi$ are the sets of visible, invisible, reasonable actors respectively. First, visibility may be taken into account to provide a complete collection representing all the actors (visible and invisible, as described herein) in the world that may be desirable to consider at one point in time. Then, latency may be taken into account on this complete world representation by forwarding the set of actors. Finally, unreasonable actors may be excluded from the forwarded set of invisible actors. In some examples, unreasonable actors may be excluded prior to the forwarding; however, this would not allow accounting for unreasonable actors who make it into reasonable states during forwarding. In addition, although unreasonable invisible actors may be excluded, unreasonable visible actors may not be excluded in some examples, because removing actually perceived actors may not result in an accurate world state.

Once each of the actors (visible, invisible, occluded, etc.) to be analyzed are determined, intersection checks may be executed using the collision checker 112 (it should be noted that the collision checker 106 and the collision checker 112 may perform similar operations, in embodiments). For example, each of the actors in the environment may be determined, and the collision checker 112 may perform intersection checks. However, because performing intersection checks on overlaps between individual points (e.g., each point within a claimed set of the ego-machine 800 in view of each point within a claimed set of an actor) for each actor may be compute intensive, especially in 3D (e.g., 2D space and 1D time), the occupied trajectories may be generated, converted, or transformed to 2D space (e.g., by collapsing or removing the temporal or third dimension) and/or may be represented by a boundary (e.g., polylines) corresponding a projection of the occupied trajectory. By reducing the intersection check to 2D space and/or performing intersection checks against edges of boundaries of 2D projected occupied trajectories (alternatively referred to herein as "projected trajectories"), the compute resources required are reduced such that the process 100 may be executed in real-time or near real-time for evaluating potential or proposed trajectories by the trajectory selector 116.

In addition, although compute and run time are decreased, the accuracy of the intersections checks using the 2D projected trajectories may still satisfy a desired accuracy level for safety-critical application—similar to that of 3D occupied trajectories. The mathematical observation the intersection check relies on is that if two volumes intersect in higher-dimensional space (e.g., 3D space), then there cannot be a projection into any lower-dimensional space (e.g., 2D space) in which the projected shapes do not intersect. So, if two projected trajectories are disjoint, then the original occupied trajectories must also be disjoint. As such, a 2D intersection of projected trajectories (e.g., projected claimed sets) is a necessary condition for having a 3D intersection of occupied trajectories (e.g., claimed sets in 3D space-time). As a result, the lower-dimensional space may be leveraged as a necessary condition—in embodiments—for selecting paths that are free of collisions.

Figure 3:
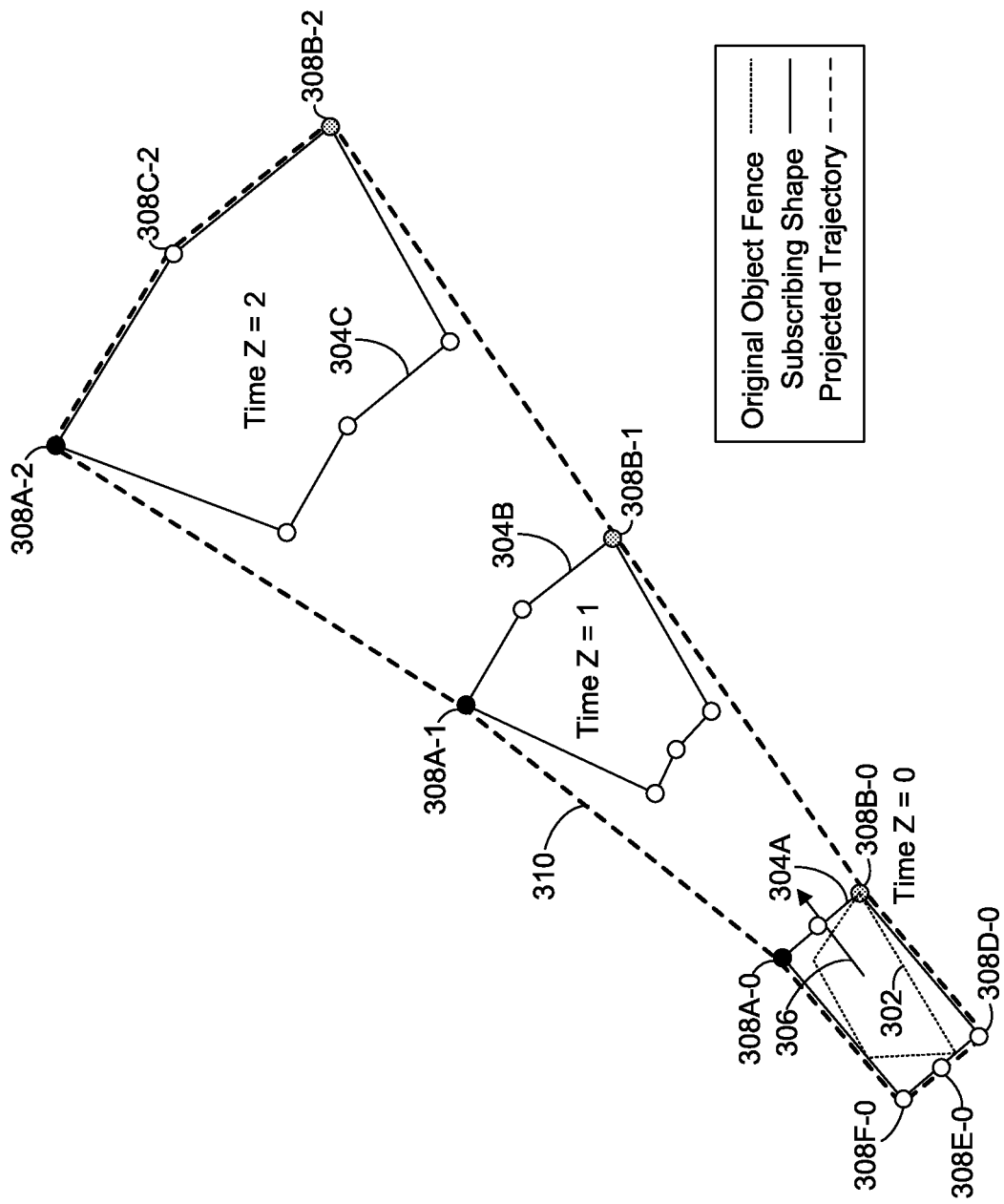
FIG. 3 depicts an example of computing a projected trajectory from a subscribing shape of an actor, in accordance with some embodiments of the present disclosure.

As such, and with respect to FIG. 3, an original object fence 302 corresponding to an object (e.g., the ego-machine 800 or another actor) may be determined, and a subscribing shape 304 (e.g., 304A-304C)—such as a subscribing rectangle, polygon, etc.—may be computed from the original object fence 302. The subscribing shape 304 may be approximated using extremal values of the original object fence 302 relative to an actor pose (e.g., position, orientation, etc.). As such, the subscribing shape 304 may be positioned or oriented relative to the actor pose, and the dimensions of the subscribing shape 304 may be computed such that the entirety of the original object fence 302 is contained within the subscribing shape 304. The subscribing shape 304 may be computed to conform directly to the extremal values of the original object fence 302 (e.g., as illustrated in FIG. 3), or may be large enough to include a buffer (e.g., to account for inaccuracy in predictions of the original object fence 302, a safety margin, etc.). At each time instance or step, a front left vertex 308A (illustrated with black fill) and a front right vertex 308B (illustrated with gray fill) of the subscribing shape 304 may be predicted forward according to a claimed set, and the front left vertices 308A and front right vertices 308B may be connected through time to define edges of a projected claimed set 310 (which may define, in embodiments, a projected trajectory). For example, front left vertices 308A-0, 308A-1, and 308A-2 (although only three time steps are shown, there may be any number, N, of time steps) may be connected, front right vertices 308B-0, 308B-1, and 308B-2 may be connected, and a front middle vertex 308C-2 of a last or final step corresponding to the projected claimed set 310 may be used to define the top most portion (or most forward in time portion) of the projected claimed set 310 (e.g., an edge may be extended from a last instance of the front left vertex 308A-2 to a last instance of the front middle vertex 308C-2 and another edge may be extended from a last instance of the front right vertex 308B-2 to the last instance of the front middle vertex 308C-2). Vertices 308D-0, 308E-0, and/or 308F-0 may be used to define a rear most portion of the projected claim set 310. As a result, the edges may define the projected claimed set 310 (indicated by dashed lines in FIG. 3) and may be compared to projected trajectories of other actors in the environment. Although three time steps (time Z=0, Z=1, and Z=2) are depicted in FIG. 3, this is not intended to be limiting, and depending on the embodiments, the projected claimed set 310 may be projected over any number of time steps.

In some embodiments, the subscribing shapes 304A, 304B, and 304C may not include a same shape at each time instance. For example, due to a variety of factors, such as those described herein, including latency, command delays, safety margins (e.g., expanding the claimed set over time to account for inaccuracies in predictions further into the future), etc., the subscribing shapes 304 may be different shapes at each time step. In addition, where the temporal dimension is computed and then collapsed, the shape of the occupied trajectory may increase over time and, as a result, may result in a larger respective subscribing shape 304 as time progresses. For example, with reference to FIG. 2, the projected trajectories 310 may correspond to the trajectories 220, 222, and 224 after projecting the trajectories 220, 222, and 224 onto a 2D plane—e.g., a ground plane—determining the subscribing shapes 304 from the projection at each time stamp, and connecting each subscribing shape 304 over time using edges to generate an outline of edges corresponding to the projected trajectory 310 that may be used for intersection checking (and/or for complete containment checking).

In embodiments where there are stationary actors—e.g., parked cars—the shape of the original object fence 302 may be used for the object instead of a subscribing shape 304. This may be the result of claimed sets—and thus projected trajectories 310—of stationary objects only including the current location of the object (e.g., with no speed element, there is no need for coming to implement a safety procedure to come to a stop as the object is already at rest). However, in other embodiments, even stationary objects may have subscribing shapes 304. In addition, in some embodiments, a subscribing shape may not be used for dynamic actors and the original object fence may be used instead.

Once the 2D or 3D projections or subscribing shapes are generated for the ego-vehicle 800 and/or each actor or object in the environment, an intersection check may be performed between edges of the projected trajectory of the ego-machine 800 and the projected trajectories of the actors. The intersection check may also include checking for fully contained actors (e.g., where an actor's projected trajectory is fully within the projected trajectory of the ego-machine 800, or vice versa). This may be performed by, as a non-limiting example, projecting a semi-infinite ray from a vertex of a projected trajectory of the actor, counting the number of intersections of the ray with the projected trajectory of the ego-machine 800, and using the number to determine whether the projected trajectory of the actor is fully contained within the projected trajectory of the ego-machine 800. Where full containment is present, the corresponding actor may be determined to have a collision event with the ego-machine 800. Where a collision is present, the corresponding safety procedure trajectory may be determined to be unsafe—e.g., have a higher safety potential that indicates a potential collision. Where no collision is present, the safety procedure trajectory may have a lower safety potential, and thus may include a safe trajectory to follow. Once the safety potential of the safety procedure is determined, control policies associated to any number of other trajectories may be examined to determine the change in safety potential. This may be represented using a control constraint image 400, that indicates which control of the ego-machine 800 are at least as safe as the safety procedure trajectory—e.g., that would not result in a collision at a current time step. For example, if a trajectory candidate decreases the safety potential between the ego-machine and another actor, then it is better than the safety procedure trajectory. Otherwise, the trajectory candidate is worse than the safety procedure trajectory. Although a control constraint image is described herein, other representations of valid and/or acceptable controls for the ego-machine 800 may be used without departing from the scope of the present disclosure.

When looking at how different controls affect the change in the safety potential (e.g., via the states of the actors), the safety potential for each different control option may be determined. The chain rule may be used to illustrate how the safety potential cannot increase so long as both the ego-machine 800 and the other actor(s) always does as well as their respective safety procedures at decreasing the safety potential. For a vehicle where the controls include lateral change (e.g., steering left or right—e.g., along an x-axis of control constraint image 400 of FIG. 4A) or longitudinal change (e.g., accelerating or decelerating—e.g., along a y-axis of the control constraint image 400), a control constraint image may be used to visualize valid and/or acceptable control options as a result of a safe driving policy (e.g., one where the safety potential is never increased with respect to the safety potential of the safety procedure).

Figure 4B:
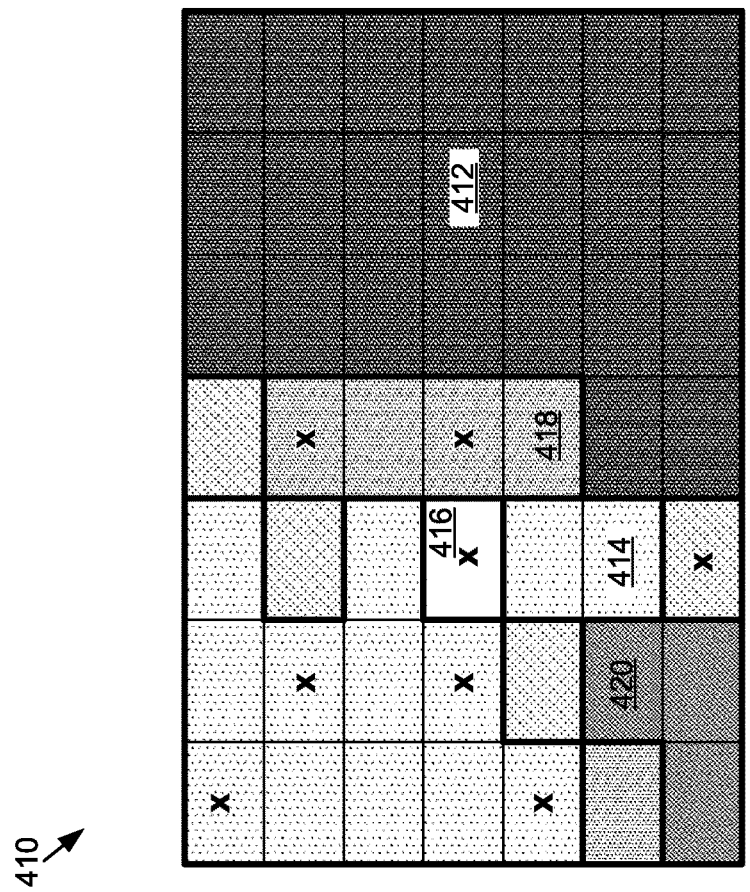
FIG. 4B depicts a control score grid for plotting trajectories computed using a behavior planner, in accordance with some embodiments of the present disclosure.
Figure 4A:
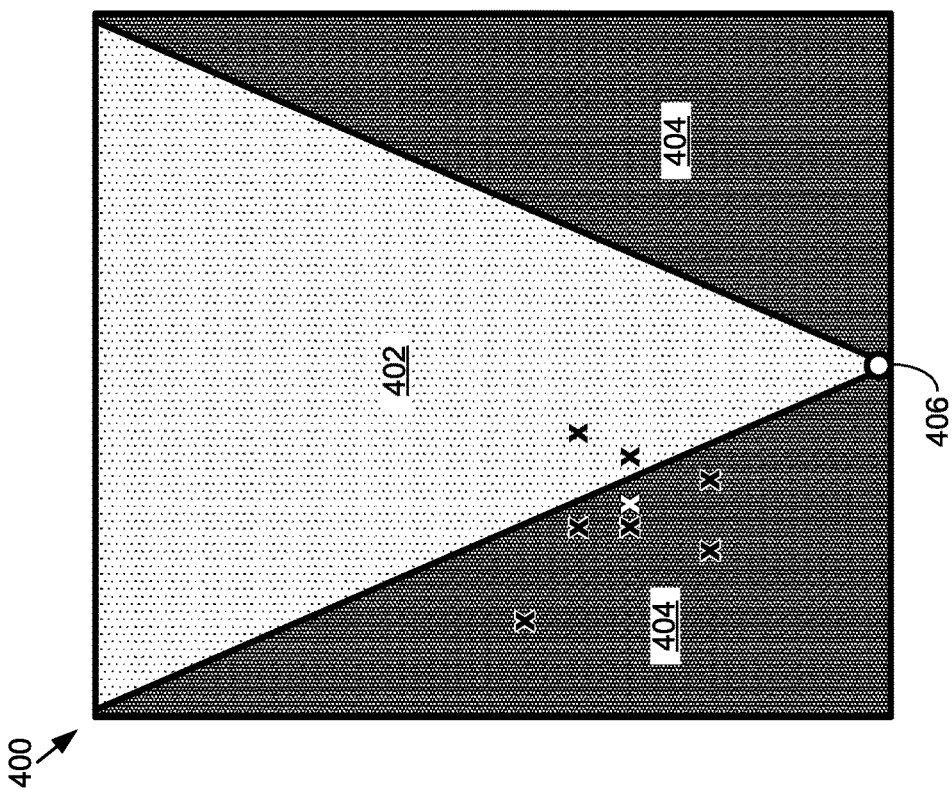
FIG. 4A depicts a control constraint image generated using a safety procedure trajectory, in accordance with some embodiments of the present disclosure.

For example, and with reference to FIG. 4A, a control constraint representation (e.g., control constraint image 400) may be representative of valid/acceptable control options 402, invalid/unacceptable control options 404, and/or safety procedure control options 406 that are associated with the safety procedure (that may be included within the valid/acceptable control option 402, as described herein). The control constraint image 400 may be a binary image such that pixels associated with the valid/acceptable control options 402 are represented by a first color, pixels associated with the invalid/unacceptable control options 404 are represented by a second color and, in some examples, pixels associated with the safety procedure control options 406 may be represented as a third color (although in other examples, the safety procedure control options 406 may be represented as the valid/acceptable control options 402 in the first color). The x-axis of the control constraint image 400 may correspond to lateral control of the vehicle (e.g., turning to the left, driving straight, or turning to the right), and may be represented by a steering angle. The y-axis of the control constraint image 400 may correspond to longitudinal control (e.g., braking, decelerating, or accelerating).

In some examples, such as where a single profile (e.g., braking profile, steering profile, etc., as described herein) defines the safety procedure and thus the claimed set, the safety procedure control options 406 may be represented by a single pixel at any point in time (as illustrated in FIG. 4A). However, in other examples, where multiple profiles (e.g., braking profiles, steering profiles, etc., as described herein) define the safety procedure and thus the claimed set, the safety procedure control options 406 may be represented by any number of pixels at any point in time.

The control constraint image 400 of FIG. 4A may be representative of the control options for the ego-machine 800 as a result of other detected objects or actors in the environment, and their safety procedure trajectories. For example, vehicle trajectories may be the result of different controls determined by a perturbation analysis, and the valid/acceptable control options 402, the invalid/unacceptable control options 404, and the safety procedure control options 406 of the control constraint image 400 may be updated based on the perturbation analysis. Object trajectories may be the result of different controls determined by a perturbation analysis of objects or actors in the environment, and the objects or actors may, in some examples, generate and/or use their own control constraint image.

In any example, the valid/acceptable control options 402 may be control options that have an equal or lesser safety potential as the safety procedure control options 406. For example, the ego-machine 800 may implement the safety procedure control options 406 and/or may implement control options (e.g., the valid/acceptable control options 402) that have an equal or lesser safety potential as the safety procedure control options 406. For example, if the safety potential associated with the safety procedure is zero (e.g., indicating that no collision will occur), then each of the valid/acceptable control options 402 and/or the safety procedure control options 406 may have an associated safety potential of zero. As another example, if the safety potential associated with the safety procedure is greater than zero (e.g., indicating that a collision may occur), then each of the valid/acceptable control options 402 and/or the safety procedure control options 406 may have an associated safety potential that is equal to or less than the safety potential associated with the safety procedure (e.g., valid/acceptable control options 402 may include control options where the safety potential is greater than zero, such as where unavoidable).

However, even where a safety potential is greater than zero (e.g., indicating that a collision may occur), a perturbation analysis (e.g., using the chain rule) may be used by the ego-machine 800 to determine the valid/acceptable control options 402. As described herein, the chain rule may link the control of the ego-machine 800 to the change in the state of the ego-machine 800 over time, and in turn, the change in the state of the ego-machine 800 may be linked to the change in the safety potential.

Once the control constraint image 400 (or the controls represented thereby) is generated at each time step using the collision checker 112, the control constraints may be used by control comparator 114 to determine nominal and/or alternate trajectories from the behavior planner 104 that are valid/acceptable (e.g., OK) or invalid/unacceptable (e.g., not OK ("NOK")), and this information may be sent to the trajectory selector 116 as one safety score or indicator from the first processing pipeline for use by the trajectory selector in selecting a trajectory (e.g., from the trajectories generated using the trajectory generator 108 and/or the safety procedure trajectory itself).

To determine the nominal and/or alternate trajectories from the behavior planner 104, the behavior planner 104 may use a trajectory generator 108 and a collision checker 106. For example, the trajectory generator 108 may generate one or more proposed trajectories for the ego-machine and/or predicted trajectories for actors or objects in the environment. For example, the trajectory generator 108 may generate any number of trajectories for the ego-machine 800, and the proposed trajectories may be analyzed—e.g., in view of safety or collision avoidance considerations, comfort considerations, consistency considerations, power/gas consumption considerations, conformance to rules of the road, etc.—to determine which trajectory(ies) to select as the nominal trajectory and/or the alternative trajectories of the ego-machine 800. One such consideration, the safety or collision avoidance consideration, may factor in to the final determination of a proposed trajectory for the ego-machine 800. This consideration may be used to filter out trajectories, penalize (e.g., apply or attribute a negative or lower weight value to) trajectories where collision or possible collision events are predicted between the ego-machine 800 and one or more actors, reward (e.g., apply or attribute a positive or higher weight value to) trajectories where an absence of a collision or possible collision event is predicted, penalize and/or reward trajectories based on who is at fault (e.g., a trajectory may be penalized more when the ego-machine 800 would be at fault but less penalized when the other actor would be at fault), penalize and/or reward based on how early or late a collision occurs in the proposed trajectories (e.g., if a collision occurs more immediately, such as within first couple of time steps, then the trajectory would be penalized more, and if a collision occurs further into trajectory, such as at a final time step, then the trajectory would be penalized less), and/or the like.

To determine the safety score, any number of different operations may be used, such as to compare each trajectory to trajectories of other vehicles or objects in the environment, to compare safety procedures along the proposed trajectory of the ego-machine 800 to safety procedures of other objects in the environment, and/or other operations.

Ultimately, the collision checker 106 may provide a safety score for one or more (e.g., each) of the trajectories generated using the trajectory generator 108.

As an example, at each point or time instance corresponding to a proposed trajectory, the safety procedure trajectory may be used for the ego-machine 800 and each other actor under consideration. For example, the safety procedure trajectory may be computed at a first time instance corresponding to a proposed trajectory (e.g., from a location in world-space corresponding to the point along the path where the ego-machine 800 would be at the first time instance), and a safety procedure trajectory may also be computed for each other actor at a location along a predicted trajectory of the actor at a point corresponding to the first time instance. This may be repeated for each time instance corresponding to the proposed trajectory of the ego-machine 800 and the predicted trajectories of the actors. Then, at each time instance, an intersection check may be performed between edges of the safety procedure trajectory of the ego-machine 800 and the safety procedure trajectories of the actors. The intersection check may also include checking for fully contained actors (e.g., where an actor's projected safety procedure trajectory is fully within the projected safety procedure trajectory of the ego-machine 800, or vice versa). This may be performed by, as a non-limiting example, projecting a semi-infinite ray from a vertex of a safety procedure trajectory of the actor, counting the number of intersections of the ray with the safety procedure trajectory of the ego-machine 800, and using the number to determine whether the safety procedure trajectory of the actor is fully contained within the safety procedure trajectory of the ego-machine 800. Where full containment is present, the corresponding actor may be determined to have a collision event with the ego-machine 800, and the corresponding proposed trajectory of the ego-machine 800 may be removed as an option or penalized (e.g., prescribed a negative weight) with respect to collision mitigation considerations—e.g., to generate a safety score.

Figure 5:
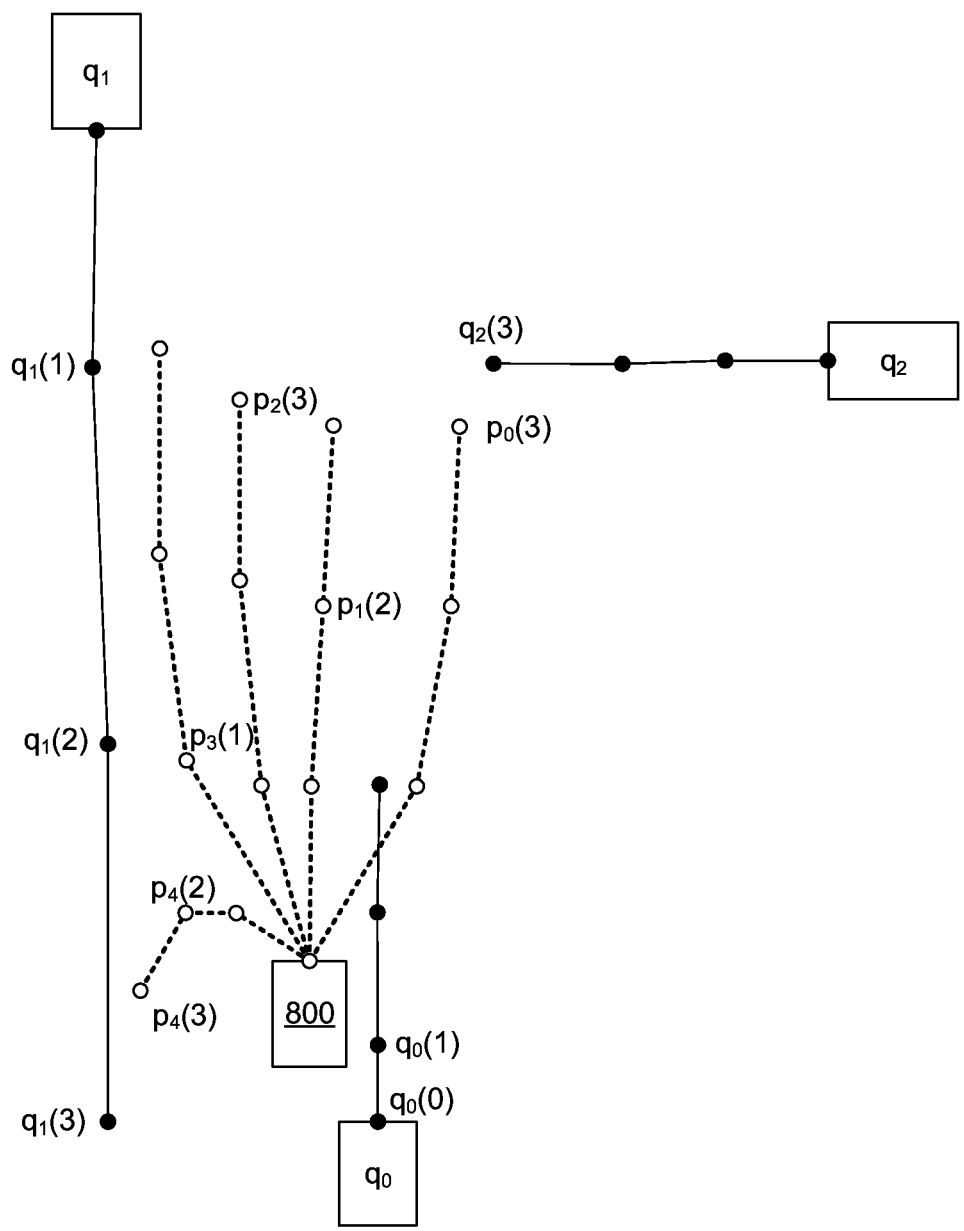
FIG. 5 depicts an example of proposed trajectories of an ego-machine and predicted trajectories of actors for intersection checking of projected trajectories corresponding thereto, in accordance with some embodiments of the present disclosure.

As an illustrative example, and with reference to FIG. 5, the trajectory generator 108 may generate a plurality of paths for the ego-machine 800—e.g., trajectory $p_0$, $p_1$, $p_2$, $p_3$, and $p_4$—and may generate a trajectory(ies) for each of the actors $q_0$, $q_1$, and $q_2$. In this non-limiting example, each trajectory may include four time steps or stamps (e.g., 0, 1, 2, and 3). At each time step, and for each actor—including the ego-machine 800—a projected safety procedure trajectory may be generated (although not illustrated in FIG. 5 for clarity purposes) using, e.g., the safety procedure generated using the safety procedure generator 102. The projected safety procedure trajectory of the ego-machine 800 may be compared against each projected safety procedure trajectory of each actor at the time step, and this process may be repeated for each time step. As the computations of intersections are executed, the individual time steps for each trajectory and/or the trajectories as a whole of the ego-machine 800 may be given a weight or score, and the final value for each path may be used by the collision checker 106 in selecting a nominal or primary trajectory and/or one or more alternative trajectories from the trajectories $p_0$, $p_1$, $p_2$, $p_3$, and $p_4$. For the purposes of this illustration, we may assume that the length of a projected safety procedure trajectory is roughly the same as a distance between two points on a trajectory, and the width of a projected safety procedure trajectory is roughly a width of a car.

When analyzing each of the trajectories of the actors in view of the trajectories of the ego-machine 800, it may be determined that actor $q_0$ and each of the trajectories $p_0$, $p_1$, $p_2$, and $p_3$ are free of intersections (or containment) events. This may be due to the lead-follow relationship of the actor $q_0$ and the ego-machine 800 and, as a result, the computation of projected trajectories and performing intersection checks may not be required for trajectories $p_0$, $p_1$, $p_2$, and $p_3$ in view of the path of the actor $q_0$—e.g., an actor pair filter may have filtered out the trajectory of the actor $q_0$ with respect to trajectories $p_0$, $p_1$, $p_2$, and $p_3$. With respect to $q_0$ and $p_4$, some of the time steps may be eliminated by the actor pair filter—e.g., time steps 1 and 2—while the remaining time steps may be determined to have disjoint or non-intersecting projected safety procedure trajectories. As a result, there may be no collision events with respect to $q_0$ and any of the trajectories of the ego-machine 800.

Further, when analyzing each of the trajectories of the actors in view of the trajectories of the ego-machine 800, it may be determined that a trajectory of the actor $q_1$ and each of the trajectories of the ego-machine 800 at time steps 0 and 3 are filtered out by the actor pair filter due to longitudinal separation (e.g., the actor $q_1$ may be outside of a radius of consideration of the ego-machine 800 and/or may be traveling along an opposite direction). At time step 1, there may be a projected safety procedure trajectory intersection at $p_3(1)$, and at time step 2, there may be a projected safety procedure trajectory intersection at $p_4(2)$. As a result, both paths $p_3$ and $p_4$ may have intersection (or containment) determinations and may be filtered out or penalized as a result.

With respect to actor $q_2$, and when analyzing each of the trajectories of the actors in view of the trajectories of the ego-machine 800, it may be determined that a trajectory of the actor $q_2$ and each of the trajectories of the ego-machine 800 at time steps 0, 1, and 2 are filtered out by the actor pair filter to longitudinal separation. At time step 3, there may be a projected trajectory intersection at $p_0(3)$. As a result, the trajectory $p_0$ may have an intersection determination and may be filtered out or penalized as a result.

As a result, the collision checker 106 may determine that the paths $p_1$ and $p_2$ are the best options with respect to safety or collision avoidance considerations, and this information may be used, at least in part, to determine the selected trajectory for the ego-machine 800.

In some examples, in order to compute the intersections between the projected trajectory of the ego-machine 800 and the projected trajectories of the actors, the trajectories may be transformed or projected in relation to one another. For example, the system may determine, for each time slice (e.g., for each segment of time used by the system, or each discrete time step), a change in location and orientation of the ego-machine 800 with respect to a first time slice (e.g., the current time). The system may then apply a transformation (e.g., an affine transformation), as a function of the change in location and orientation, to the projected trajectory of the ego-machine 800 for each time slice after the first time slice in order to effectively cancel out (at least along the axis(es) of movement) the change in the projected trajectory of the ego-machine 800 over time. The system may also apply the same transformation, based on the change in location and orientation of the ego-machine 800, to the projected trajectories of the actors for each time slice after the first time slice in order to render the projected trajectories of the actors in relation to the now (substantially) static projected trajectory of the ego-machine 800.

As a result, the ego-machine 800 may appear stationary while the actors may appear to move with respect to the ego-machine 800. Using these processes, intersections between the projected safety procedure trajectories may be more clearly computed (or visualized). In some embodiments, using this transformation (e.g., a homeomorphism followed by a projection) to generate the relative projected trajectories, and because the projections would be relative to the ego-machine 800, a constant gap or space between the transformed projected trajectory of an actor and the transformed projected (now static) trajectory of the ego-machine 800 may be easily observable and leveraged for spatial relationship evaluations. As a result, this transformation would make the projected 2D intersection check a necessary and sufficient condition for the 3D intersection check.

Once the nominal or primary trajectory and/or one or more alternate trajectories are determined using the collision checker 106, these trajectories including their corresponding safety scores—and/or other score types, such as comfort, etc.—may be sent to the trajectory selector 116. This process of computing the trajectories, evaluating the trajectories using the collision checker 112, and sending the nominal and/or alternate trajectories to the trajectory selector 116 may correspond to a discrete processing pipeline, as described in more detail herein.

In addition, the nominal or primary trajectory and/or the one or more alternate trajectories may be used by a control projector 110 to determine at least the initial controls for the ego-machine 800 were the ego-machine 800 to follow the respective trajectory from a current state of the ego-machine 800. For example, each trajectory may be converted to control space so that the control comparator 114 may analyze whether the trajectory is safe—or at least as safe as the safety procedure trajectory. The conversion may be executed using a pure pursuit algorithm, in non-limiting embodiments, due to the efficiency of the algorithm and the potential for a large number of trajectories that need to be analyzed. Each converted trajectory (e.g., nominal and/or alternate trajectory that is converted to the control space) may then be analyzed in view of the control constraint image 400 of FIG. 4A (e.g., as indicated by the "x" plots in the control constraint image 400). In embodiments, when converting the controls for each trajectory, the converted trajectories may be represented using a scoring grid 410, where each grid point corresponds to a potential trajectory, and the color coding indicates the score (e.g., darker shading such as at 412 indicates a forward collision is likely, less dark shading such as at 420 indicates a non-frontal collision is likely, even less dark shading such as in 414 or 418 indicates no collision is likely, and no shading as in 416 indicates the nominal or primary trajectory with no collision and/or also best overall score). The scoring for classifying each trajectory into the grid 410 may be computed, in embodiments, using equation (9), below:

$$\text{score} = \Sigma_{t=0}^{T} \alpha^{t} * \text{penalty} \qquad (9)$$

where a is a temporal discounting factor between 0 and 1.

The penalties are selected such that forward collisions are penalized more heavily than rear collisions, and the score are cumulative over the time steps of the trajectories. In embodiments, if a frontal collision is identified at a time step, no accumulation occurs for future time steps of the trajectory to reduce compute as a frontal collision is already a maximum score.

These controls from the scoring grid 410 may then be mapped to the control space of the control constraint image 400. The controls in the scoring grid 410 with an "x" indicate trajectories that the behavior planner 104 determined had a safety score at least as safe as the safety procedure trajectory safety score. As such, these trajectories (or at least an initial portion or time step(s) of the trajectories) may be mapped to the control constraint image 400—as indicated by the plotted "x" marks in the control constraint image 400 and compared to the valid/acceptable or invalid/unacceptable controls of the control constraint image 400 using the control comparator 114. In this example, the nominal trajectory in grid cell 416—indicated by the white "x" in FIG. 4A—may land as an invalid/unacceptable control option 404 in the control constraint image 400. As such, this nominal trajectory may be labeled or tagged as "NOK" or not okay. However, at least two of the trajectories are included in the valid/acceptable control options 402 of the control constraint image 400, and these trajectories may be tagged or labeled as "OK." This process may be repeated for each nominal and/or alternate trajectory received from the behavior planner 104, and the safety scores of "NOK" or "OK" may be used by the trajectory selector 116 when determining the selected trajectory.

The trajectory selector 116 may then use the safety procedure trajectory and the safety scores—in addition to other score, in embodiments—from the first processing pipeline (e.g., including the collision checker 112, the control comparator 114, and the control projector 110) and the second processing pipeline (e.g., including the behavior planner 104, the collision checker 106, and the trajectory generator 108) to determine the selected trajectory. For example, the set of trajectories from the behavior planner 104 may be arbitrated using the behavior planner safety score and the control comparator safety score (e.g., "NOK" or "OK") to choose the safest trajectory that both the first processing pipeline and the second processing pipeline agree to. In some embodiments, a safest trajectory may not be selected, but a trajectory that is at least as safe as the safety procedure trajectory may be selected—e.g., based on scores for comfort, efficiency, etc. The arbitration logic, in embodiments, may be executed using the code below, where the behavior planner 104 scores are indicated using so, $s_1, \ldots, s_k, s_{nominal}, s_{SafetyProcedure}$, and the control comparator 1114 scores are indicated as $b_0, b_1, \ldots, b_k, b_{nominal}$.

```
if bnominal == true and snominal >= SafetyProcedure: return index of nominal // normal
operation
else:
        bestScore = safetyProcedure
        bestTrajIndex = index of safety procedure
        for i = 0, ...., k
        {
            if (bi == true and si > bestScore) // Both SFF and BP think this trajectory is better than
Safety Procedure
            {
                 bestScore = si
                 bestTrajIndex = i
            }
        }
        return bestTrajIndex
```

Ultimately, a trajectory may only be selected and executed where both the first processing pipeline and the second processing pipeline agree that the trajectory is a good choice with respect to the safety goals (described herein). In this way, a single point of failure may be avoided, because for the system to fail both processing pipelines would have to misjudge or make a mistake at the same time instance.

Once the selected trajectory is determined, vehicle dynamic control (VDC) 118 may use the trajectory to generate one or more actuation commands. Although the VDC 118 is described, this is not intended to be limiting, and any control component of the ego-machine 800 may be used. This process may be completed at any number of (e.g., each) time instances such that new trajectories are generated, analyzed, and selected, and the ego-machine 800 follows the trajectories selected by the trajectory selector 116 along the way.

Figure 6:
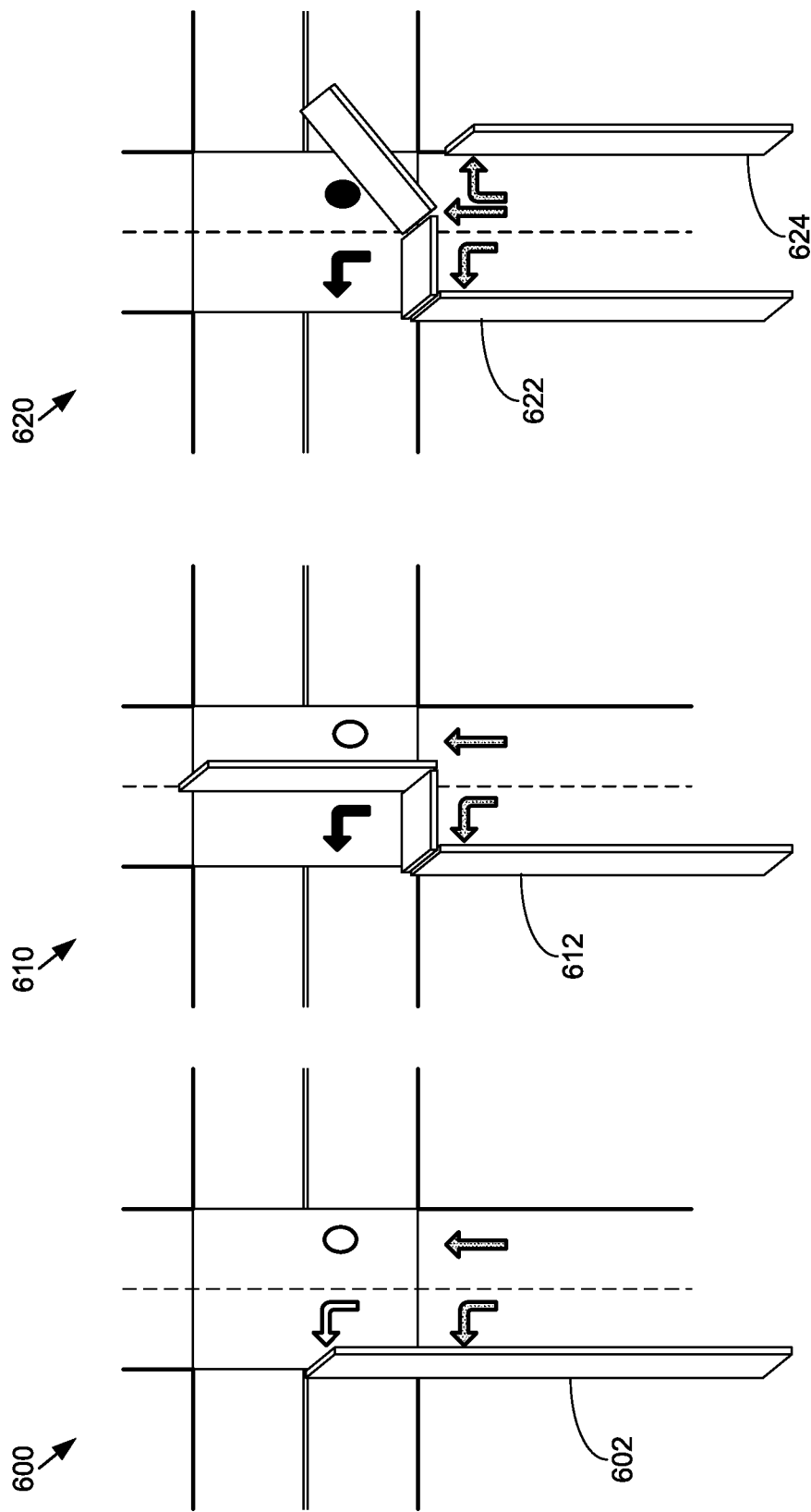
FIG. 6 depicts examples of artificial boundaries generated to comply with rules of the road, in accordance with some embodiments of the present disclosure.

In some embodiments, when evaluating collisions with objects (e.g., static and/or dynamic) in the environment—e.g., using the first processing pipeline and/or the second processing pipeline—the rules of the road may be modeled as artificial obstacles. For example, safety critical violations may be modeled using artificial obstacles along edges of drivable space, or along lane marking or lane boundaries in intersections—e.g., to prevent accidentally running a red light. In embodiments, the artificial boundaries may be implanted using a simple state machine that enables or disables these obstacles depending on a light state (e.g., red light, green light, yellow light, flashing light, etc.), and/or whether the ego-machine 800 has already come to a complete stop at a stop sign to decide which additional walls should be observed. The obstacles may be placed, in embodiments, a small distance from the actual boundary to avoid false positive triggers. Examples of such walls are illustrated in FIG. 6, where a first visualization 600 includes a barrier 602 extending along a lane boundary of a left turn lane (e.g., because the next lane over may correspond to an opposite direction of travel, or may not be a drivable surface) and across a lane where the ego-machine 800 may not turn left into due to the lane having an opposite direction of travel. As such, when analyzing the environment for collisions, the barrier 602 may be factored in. Similarly, visualization 610 includes a barrier 604 that extends similarly as the barrier 602, and then blocks off the left turn due to the left turn arrow being red. Visualization 620 includes a first barrier 622 that extends similarly to the barrier 612 but further blocks off the right lane and traveling forward due to the red light. A second barrier 624 is also included to block the ego-machine 800 from turning right prior to coming to a stop, and waiting for the opportunity to turn right on red per traffic rules.

As illustrated in FIG. 1, and as described herein, to satisfy a higher safety integrity level (e.g., ASIL D), the two or more processing pipelines may be used that may each comply with a lower safety integrity level (e.g., ASIL B(D)). Using safety decomposition, the two processing pipelines may result in a decision by the trajectory selector 116 that is ASIL D compliant. To accomplish this, one or more hardware components of the processing pipelines may be discrete from one or more hardware components of the other processing pipelines to avoid single point failures. For example, although a CPU may be capable of ASIL D compliance, CPUs may not be as efficient at performing the required operations of the different processing pipelines—e.g., due to their serial nature and inability to perform computations in parallel. As a result, higher throughput hardware components—such as GPUs, accelerators, etc.—may be used to increase efficiency, reduce latency, reduce compute, and/or the like. However, GPUs, accelerators, and/or other processing units may not yet be capable of satisfying ASIL D compliance. As such, a first processing pipeline may include a first lower safety integrity level compliant component (e.g., a GPU) and a second processing pipeline may include a second lower safety integrity compliant component (e.g., a PVA). The CPU may still be involved—e.g., as indicated in FIG. 1—to control, manage, or schedule operations executed using the other processing components, but the lower safety integrity level processing components may still be used to increase efficiency. As such, the GPU may not be involved in the first processing pipeline and the accelerator (e.g., a PVA) may not be involved in the second processing pipeline, or vice versa. Although the PVA is illustrated as being used for the first processing pipeline including the collision checker 112, the control comparator 114, and the control projector 110, and the GPU is used in the second processing pipeline including the behavior planner 104, this is not intended to be limiting. For example, the first processing pipeline may use the GPU and the second processing pipeline may use the PVA. In other embodiments, different processing units—e.g., parallel processing units (PPUs), accelerators, etc.—may be used in addition to or alternatively from the GPU or the PVA. As such, by using different processing pipelines with discrete processing components, the final output from the trajectory selector 116 may be ASIL D compliant due to the removal of any single point failures.

Figure 7:
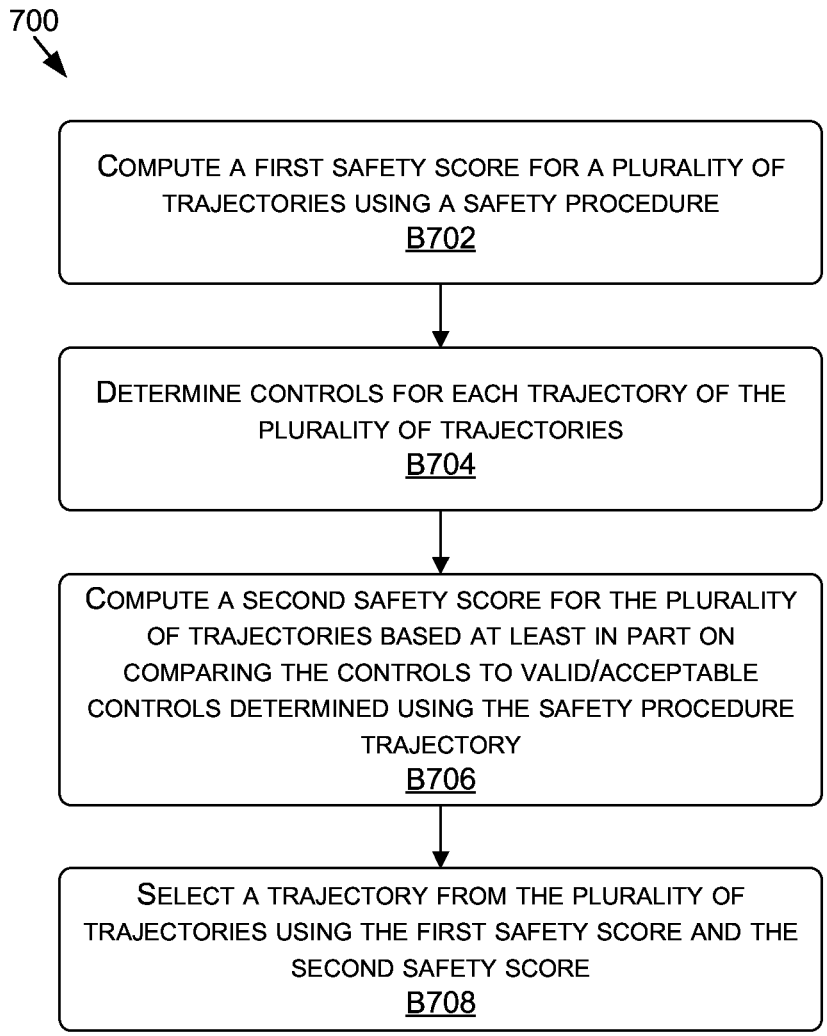
FIG. 7 is a flow diagram for a method of selecting a trajectory using safety decomposition, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 100 of FIG. 1. However, this method 700 may additionally or alternatively be executed by any one system, or any combination of systems, including, but not limited to, those described herein.

FIG. 7 is a flow diagram showing a method 700 for selecting a trajectory using safety decomposition, in accordance with some embodiments of the present disclosure. The method 700, at block B702, includes computing a first safety score for a plurality of trajectories using a safety procedure trajectory. For example, a first processing pipeline—e.g., including the behavior planner 104—may compute a nominal and/or one or more alternate trajectories.

The method 700, at block B704, includes determining controls for each trajectory of the plurality of trajectories. For example, the control projector 110 of the second processing pipelines may convert the trajectories to the control space.

The method 700, at block B706, includes computing a second safety score for the plurality of trajectories based at least in part on comparing the controls to valid and/or acceptable controls determined using the safety procedure trajectory. For example, the control comparator 114 of the second processing pipeline may compare the controls from the one or more trajectories of the behavior planner 104 to a control constraint image 400 generated using the collision checker 112.

The method 700, at block B708, includes selecting a trajectory from the plurality of trajectories using the first safety score and the second safety score. For example, the trajectory selector 116 may select a trajectory using the first safety score from the first processing pipeline, the second safety score from the second processing pipeline (e.g., a Boolean safety score from the control comparator 114), and/or one or more other scores corresponding to comfort, efficiency, etc. Once the trajectory is selected, one or more operations may be executed using the selected trajectory, such as for the VDC 118 to generate one or more actuation commands for controlling the ego-machine 800 according to the selected trajectory.

Example Autonomous Vehicle

Figure 8A:
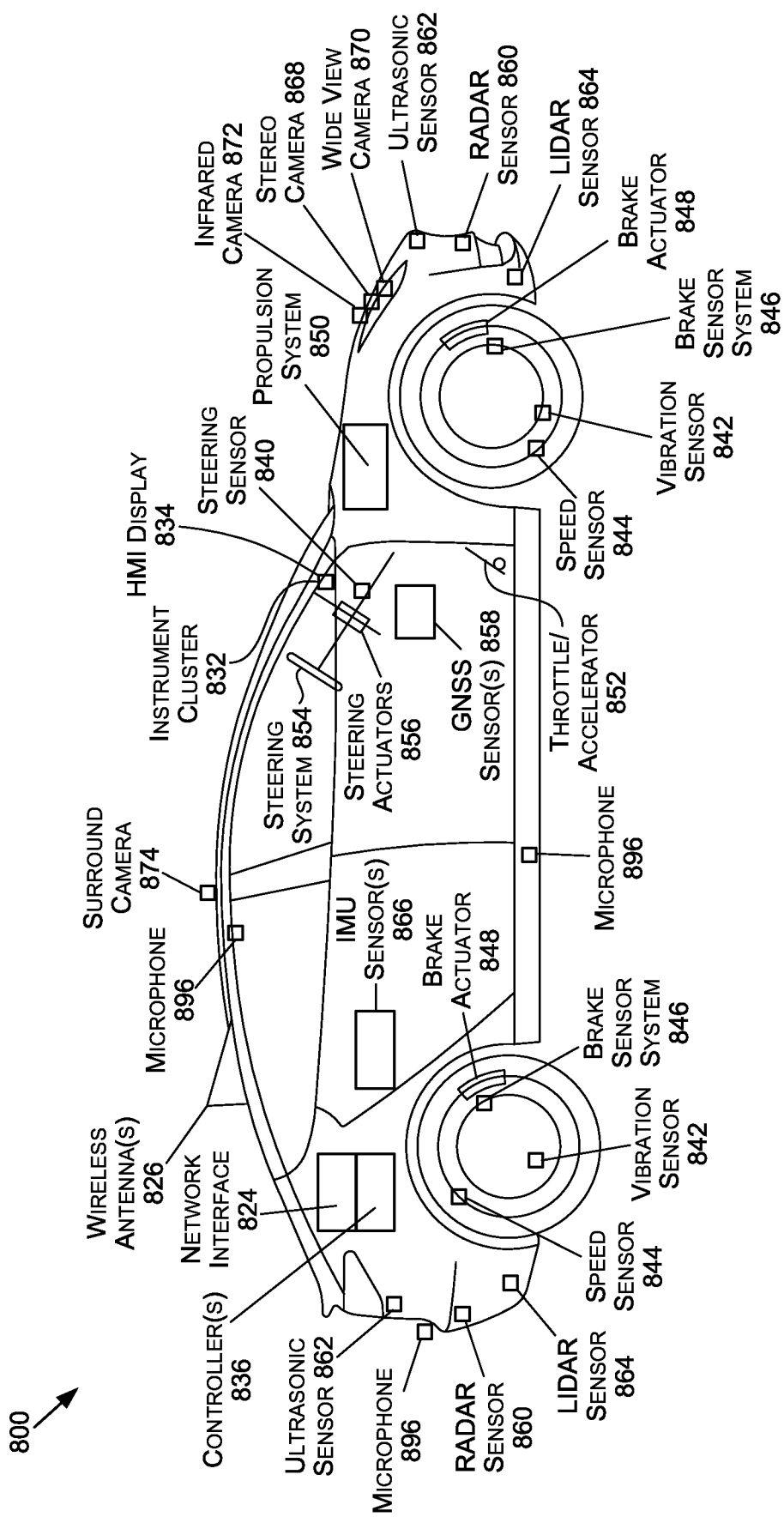
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
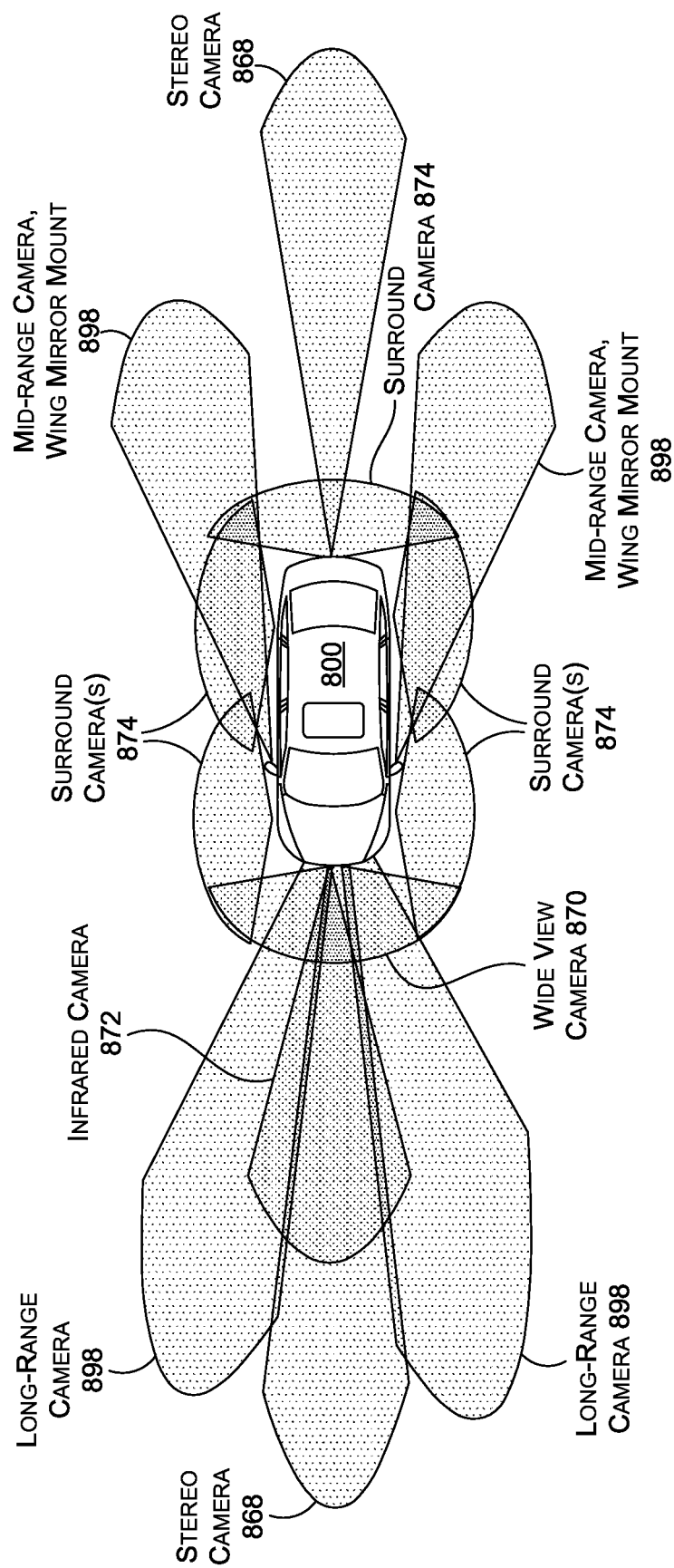
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
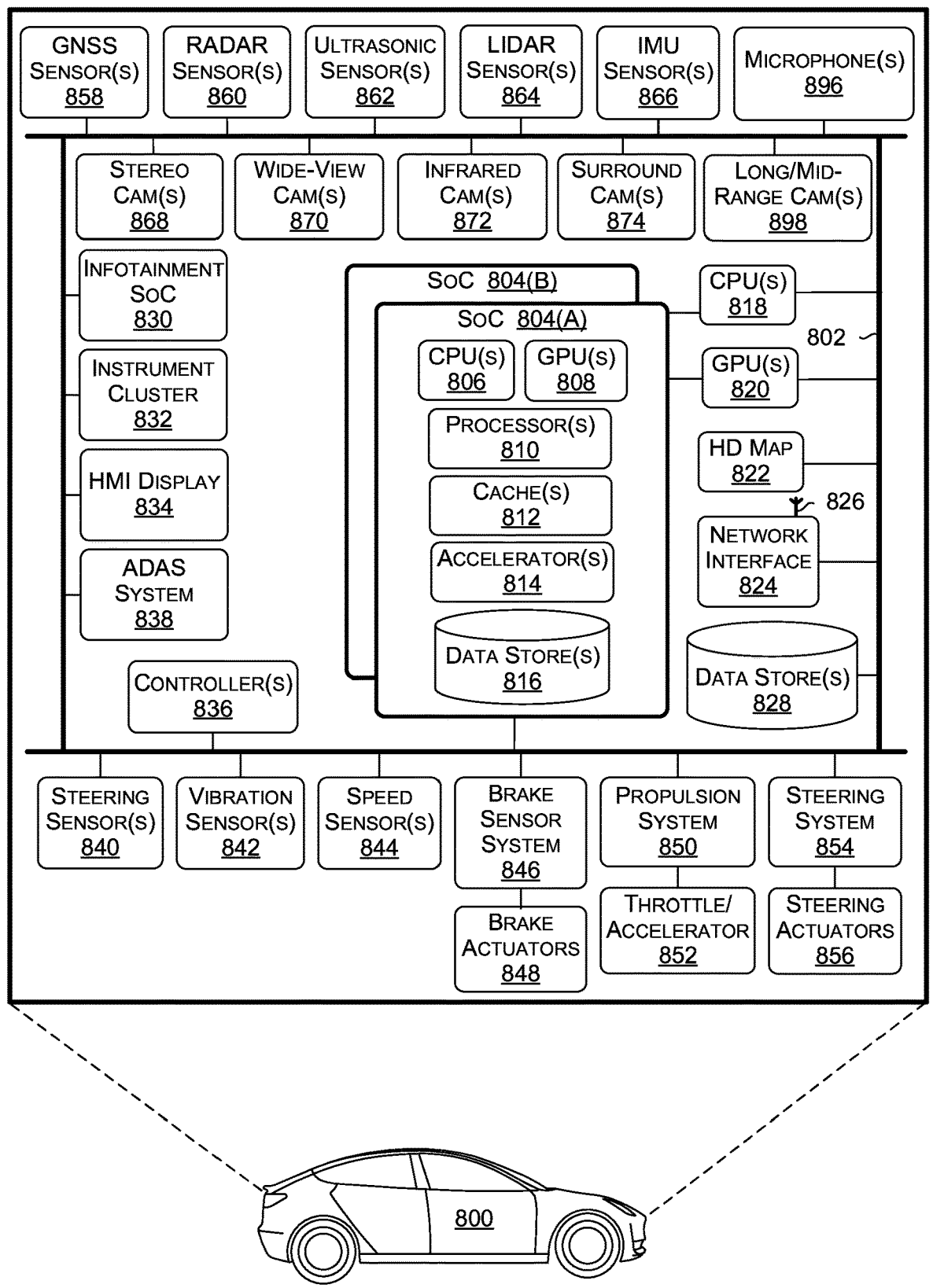
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
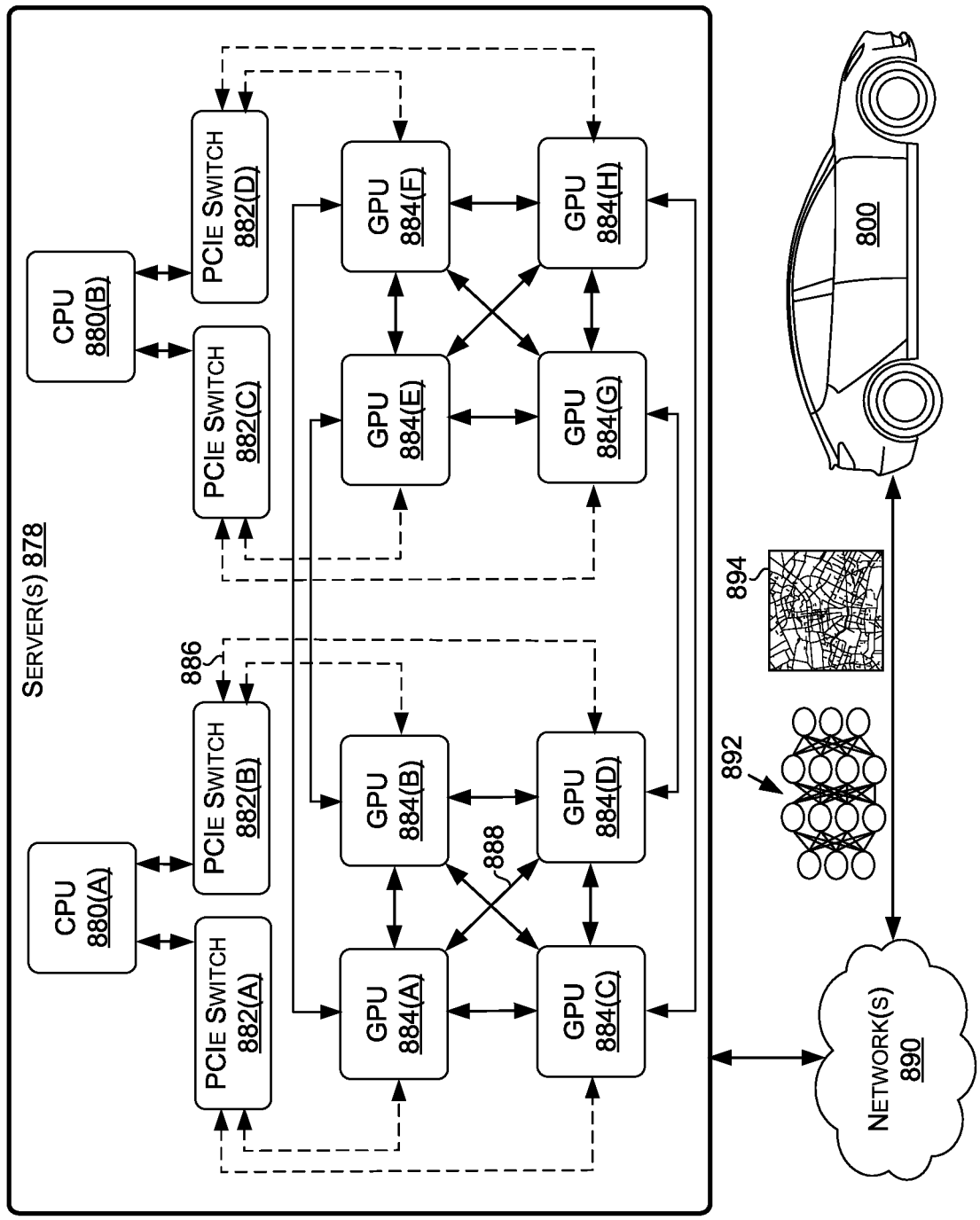
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
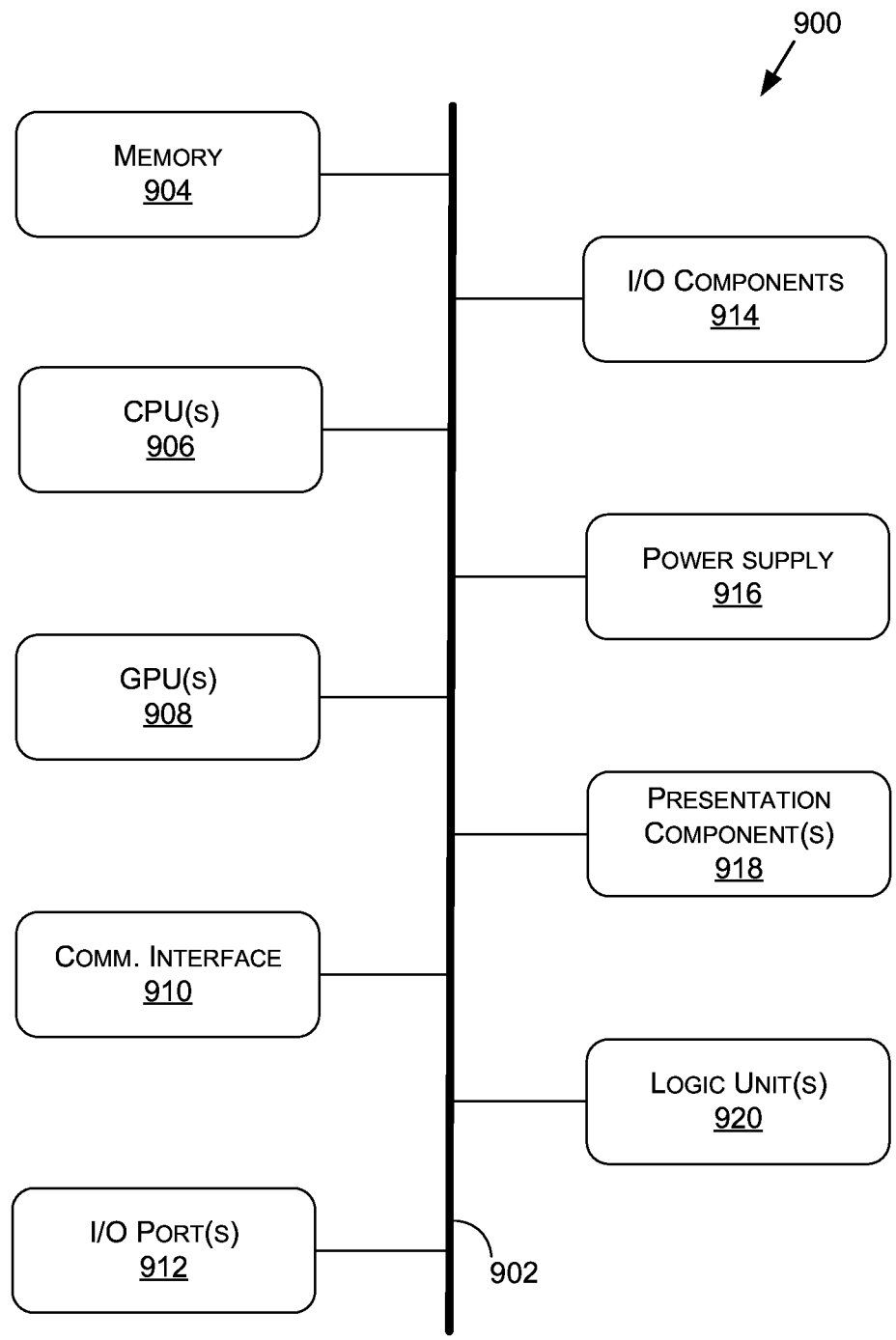
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
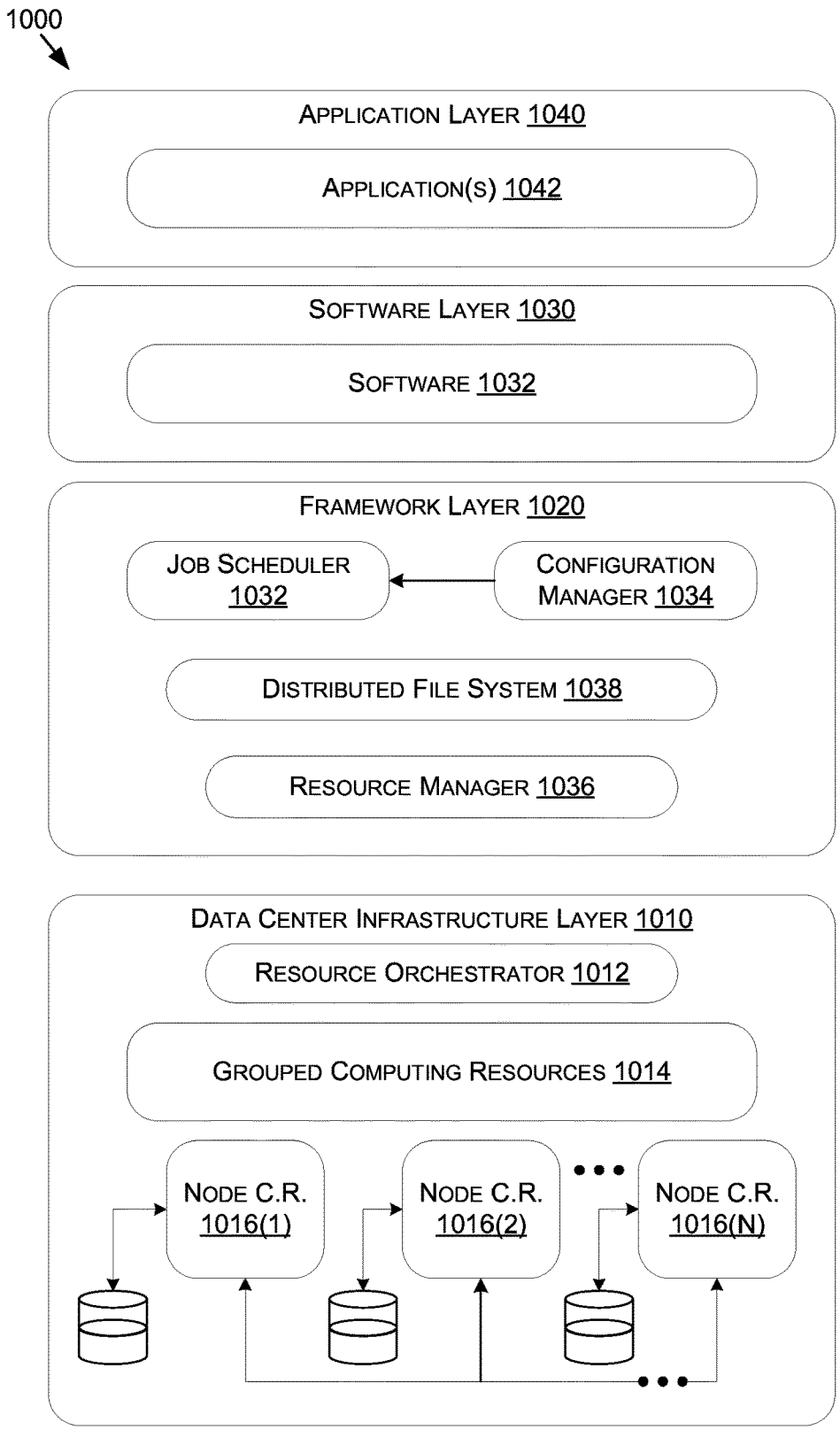
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
    one or more first processors to:
        determine, based at least on at least a first portion of sensor data generated using a machine, one or more trajectories based at least on a safety procedure trajectory; and
        determine one or more first controls that the machine may perform to navigate the one or more trajectories over a future time period;
    one or more second processors to:
        generate, based at least on at least a second portion of the sensor data, a control constraint image using the safety procedure trajectory, the control constraint image indicative of one or more second controls that the machine may perform over the future time period and having a safety score that is at least as high as the safety procedure trajectory;
        compare the one or more first controls associated with the future time period to the one or more second controls associated with the future time period to determine whether the one or more first controls correspond to the one or more second controls; and
        determine one or more validities of the one or more trajectories based at least on the comparison; and
    one or more third processors to:
        select a trajectory from the one or more trajectories based at least on the one or more validities; and
        cause the machine to perform one or more operations based at least on the trajectory.

2. The system of claim 1, wherein:
    the one or more first controls include at least one of one or more first lateral controls and one or more first longitudinal controls;
    the one or more second controls include at least one of one or more second lateral controls and one or more second longitudinal controls; and
    the determination of whether the one or more first controls correspond to the one or more second controls comprises determining whether the one or more first controls match the one or more second controls.

3. The system of claim 1, wherein the one or more second processors are further to determine the safety score of the safety procedure trajectory.

4. The system of claim 1, wherein the determination of the one or more trajectories includes, for an individual trajectory:
    projecting, at one or more points of the individual trajectory, the safety procedure trajectory; and
    comparing the safety procedure trajectory to one or more safety procedure trajectories of one or more detected objects.

5. The system of claim 1, wherein the one or more third processors are further to generate the safety procedure trajectory.

6. The system of claim 1, wherein the one or more first processors are capable of being associated with a first safety integrity level of ISO 26262 ASIL B or lower, the one or more second processors are different than the one or more first processors and are capable of being associated with a second safety integrity level of ISO 26262 ASIL B or lower, and the one or more third processors are different than the one or more second processors and are capable of being associated with a third safety integrity level of ISO 26262 ASIL D.

7. The system of claim 1, wherein the one or more first processors include a first processor type and the one or more second processors include a second processor type different from the first processor type.

8. The system of claim 1, wherein the safety score of the safety procedure trajectory is determined using one or more artificial boundaries generated based at least on one or more rules of a road.

9. The system of claim 1, wherein the system is comprised in at least one of:
    a control system for an autonomous or semi-autonomous machine;
    a perception system for an autonomous or semi-autonomous machine;
    a system for performing simulation operations;
    a system for performing deep learning operations;
    a system implemented using an edge device;
    a system implemented using a robot;
    a system incorporating one or more virtual machines (VMs);
    a system implemented at least partially in a data center; or
    a system implemented at least partially using cloud computing resources.

10. The system of claim 1, wherein the determination of the one or more validities of the one or more trajectories based at least on the comparison comprises:
    determining, based at least on a first control of the one or more first controls corresponding to the one or more second controls, a first validity for a first trajectory of the one or more trajectories; and
    determining, based at least on a second control of the one or more first controls not corresponding to the one or more second controls, a second validity for a second trajectory of the one or more trajectories, the second validity being different than the first validity.

11. The system of claim 1, wherein the determination that the one or more first controls correspond to the one or more second controls comprises determining, based at least on the comparison, that one or more first points associated with the one or more first controls match one or more second points associated with the one or more second controls.

12. The system of claim 1, wherein:
the comparison of the one or more first controls associated with the future time period to the one or more second controls associated with the future time period to determine whether the one or more first controls correspond to the one or more second controls comprises:
  determining, based at least on the one or more first controls, one or more first pixels associated with the control constraint image;
  comparing the one or more first pixels to one or more second pixels of the control constraint image that are associated with the one or more second controls; and
  determining, based at least on the comparing, whether the one or more first pixels correspond to the one or more second pixels; and
the determination of the one or more validities of the one or more trajectories is based at least on the determining whether the one or more first pixels correspond to the one or more second pixels.

13. A method comprising:
computing a first safety score for at least a trajectory of one or more trajectories using a safety procedure trajectory that is associated with a future time period;
determining one or more controls for the trajectory of the one or more trajectories, the one or more trajectories also associated with the future time period;
computing a second safety score for at least the trajectory of the one or more trajectories based at least on comparing the one or more controls to one or more valid controls determined using the safety procedure trajectory that is associated with the future time period;
selecting the trajectory from the one or more trajectories using the first safety score and the second safety score; and
causing a machine to perform one or more operations based at least on the trajectory.

14. The method of claim 13, wherein the first safety score is capable of being computed with an associated ISO 26262 ASIL B and the second safety score is capable of being computed with an associated ISO 26262 ASIL B such that the selection of the trajectory is capable of satisfying ISO 26262 ASIL D.

15. The method of claim 13, wherein the computing the first safety score includes comparing, at each point of two or more points of the trajectory, the safety procedure trajectory to one or more safety procedure trajectories of one or more objects in an environment.

16. The method of claim 13, wherein the one or more valid controls include one or more first controls corresponding to the safety procedure trajectory and one or more second controls corresponding to one or more second trajectories that are at least as safe as the safety procedure trajectory.

17. The method of claim 13, wherein the computing the second safety score includes using one or more artificial boundaries generated based at least on one or more rules of a road.

18. The method of claim 13, wherein the selecting the trajectory from the one or more trajectories using the first safety score and the second safety score comprises:
determining that the first safety score indicates that the trajectory is safe to perform;
determining that the second safety score indicates that the trajectory is safe to perform; and
selecting the trajectory based at least on both the first safety score and the second safety score indicating that the trajectory is safe to perform.

19. A system comprising:
one or more processors to:
  compute a first safety score for at least a trajectory of one or more trajectories using a safety procedure trajectory that is associated with a future time period;
  determine one or more controls for the trajectory of the one or more trajectories, the one or more trajectories also associated with the future time period;
  compute a second safety score for at least the trajectory of the one or more trajectories based at least on comparing the one or more controls to one or more valid controls determined using the safety procedure trajectory that is associated with the future time period;
  select the trajectory from the one or more trajectories using the first safety score and the second safety score; and
  cause a machine to perform one or more operations based at least on the trajectory.

20. The system of claim 19, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

* * * * *